(12) United States Patent
Wan

(10) Patent No.: US 10,827,533 B2
(45) Date of Patent: **\*Nov. 3, 2020**

(54) METHOD, APPARATUS AND SYSTEM FOR PROCESSING VERY-HIGH-SPEED RANDOM ACCESS

(71) Applicant: Huawei Technologies Co., Ltd., Shenzhen (CN)

(72) Inventor: Li Wan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,043

(22) Filed: Oct. 24, 2019

(65) Prior Publication Data

US 2020/0059972 A1    Feb. 20, 2020

Related U.S. Application Data

(63) Continuation of application No. 16/026,830, filed on Jul. 3, 2018, now Pat. No. 10,485,031, which is a
(Continued)

(30) Foreign Application Priority Data

Aug. 7, 2012    (CN) .......................... 2012 1 0278680

(51) Int. Cl.
    *H04W 74/08*        (2009.01)
    *H04J 13/00*        (2011.01)
    (Continued)

(52) U.S. Cl.
    CPC ..... *H04W 74/0833* (2013.01); *H04J 13/0062* (2013.01); *H04J 13/16* (2013.01);
    (Continued)

(58) Field of Classification Search
    None
    See application file for complete search history.

(56) References Cited

U.S. PATENT DOCUMENTS 8,693,412 B2    4/2014 Jarni et al.
9,420,582 B2    8/2016 Hooli et al.
(Continued)

FOREIGN PATENT DOCUMENTS

CN    101606334 A    12/2009
CN    101636937 A    1/2010
(Continued)

OTHER PUBLICATIONS

Nokia,"Restricted sets of RACH preamble signatures for environments with high Doppler shifts," 3GPP TSG RAN WG1 #47bis, R1-070377, Sorrento, Italy, pp. 1-6, 3rd Generation Partnership Project, Valbonne, France (Jan. 15-19, 2007).
(Continued)

*Primary Examiner* — Michael J Moore, Jr.
(74) *Attorney, Agent, or Firm* — Leydig, Voit & Mayer, Ltd.

(57) ABSTRACT

A method for processing very-high-speed random access includes: selecting a Zadoff-Chu (ZC) sequence group according to a cell type and a first cyclic shift parameter Ncs, and setting N detection windows for each ZC sequence in the ZC sequence group, where N≥5; sending the cell type, a second Ncs, and the ZC sequence group to a user equipment (UE); receiving a random access signal sent by the UE, and obtaining the random access sequence from the random access signal; performing correlation processing on the random access sequence with each ZC sequence in the ZC sequence group, detecting a valid peak value in the N detection windows of each ZC sequence, and determining an estimated value of a round trip delay (RTD) according to the valid peak value, so that a UE in a very-high-speed scenario
(Continued)

can normally access a network, thereby improving network access performance.

23 Claims, 6 Drawing Sheets

Related U.S. Application Data continuation of application No. 15/601,703, filed on May 22, 2017, now Pat. No. 10,039,133, which is a continuation of application No. 14/600,615, filed on Jan. 20, 2015, now Pat. No. 9,674,872, which is a continuation of application No. PCT/CN2013/076974, filed on Jun. 8, 2013.

(51) Int. Cl.
*H04W 74/00* (2009.01)
*H04J 13/16* (2011.01)
*H04J 11/00* (2006.01)

(52) U.S. Cl.
CPC ....... *H04W 74/002* (2013.01); *H04W 74/006* (2013.01); *H04J 2011/0096* (2013.01)

(56) References Cited

U.S. PATENT DOCUMENTS

| | | | |
|---|---|---|---|
| 9,674,872 B2* | 6/2017 | Wan | H04W 74/002 |
| 9,893,830 B2 | 2/2018 | Iwai et al. | |
| 9,912,432 B2 | 3/2018 | Ogawa et al. | |
| 10,039,133 B2* | 7/2018 | Wan | H04W 74/002 |
| 10,485,031 B2* | 11/2019 | Wan | H04J 13/16 |
| 2007/0171889 A1 | 7/2007 | Kwon et al. | |
| 2007/0259693 A1 | 11/2007 | Brunel et al. | |
| 2008/0194259 A1 | 8/2008 | Vujcic et al. | |
| 2008/0267134 A1 | 10/2008 | Cheng et al. | |
| 2009/0028065 A1 | 1/2009 | Iwai et al. | |
| 2009/0213968 A1 | 8/2009 | Tormalehto | |
| 2010/0054235 A1 | 3/2010 | Kwon et al. | |
| 2010/0099423 A1 | 4/2010 | Ogawa et al. | |
| 2010/0195700 A1 | 8/2010 | Ogawa et al. | |
| 2010/0220664 A1 | 9/2010 | Hooli et al. | |
| 2010/0285755 A1 | 11/2010 | Iwai et al. | |
| 2011/0235529 A1 | 9/2011 | Zetterberg et al. | |
| 2011/0292816 A1 | 12/2011 | Lee et al. | |
| 2013/0223241 A1 | 8/2013 | Zhang et al. | |
| 2014/0293918 A1 | 10/2014 | Vujcic et al. | |
| 2014/0321398 A1 | 10/2014 | Guo et al. | |
| 2015/0003421 A9 | 1/2015 | Kwon et al. | |

FOREIGN PATENT DOCUMENTS

| | | |
|---|---|---|
| CN | 101689882 A | 3/2010 |
| CN | 102098741 A | 6/2011 |
| EP | 1852981 A1 | 11/2007 |
| EP | 1944935 A2 | 7/2008 |
| EP | 2501064 A1 | 9/2012 |
| JP | 2010516076 A | 5/2010 |
| JP | 2010518724 A | 5/2010 |
| JP | 2012511278 A | 5/2012 |
| WO | 2008082262 A2 | 7/2008 |
| WO | 2008149314 A2 | 12/2008 |
| WO | 2009149760 A1 | 12/2009 |
| WO | 2011059068 A1 | 5/2011 |

OTHER PUBLICATIONS

Texas Instruments et al., "Sequence ordering for PRACH in E-UTRA," 3GPP TSG RAN WG1 #50bis, Shanghai, China, R1-074145, pp. 1-9, 3rd Generation Partnership Project, Valbonne, France (Oct. 8-12, 2007).
Panasonic et al., "Limitation of RACH sequence allocation for high mobility cell," 3GPP TSG RAN WG1 Meeting #50bis, Shanghai, China, R1-074422, pp. 1-7, 3rd Generation Partnership Project, Valbonne, France (Oct. 8-12, 2007).
Nokia Siemens Networks, et al. "On construction and signaling of RACH preambles," 3GPP TSG RAN WG1 #49, Kobe, Japan, R1-072268, pp. 1-5, 3rd Generation Partnership Project, Valbonne, France (May 7-11, 2007).
"3rd Generation Partnership Project; Technical Specification Group Radio Access Network; Requirements for Evolved UTRA (E-UTRA) and Evolved UTRAN (E-UTRAN) (Release 9)," 3GPP TR 25.913, V9.0.0, pp. 1-18, 3rd Generation Partnership Project, Valbonne, France (Dec. 2009).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, pp. 1-101, 3rd Generation Partnership Project, Valbonne, France (Jun. 2012).
Notice of Allowance in Japanese Patent Application No. 2015-524607, pp. 1-4 (dated May 9, 2017).
Office Action in U.S. Appl. No. 14/600,615 pp. 1-24, (dated Sep. 15, 2016).
Notice of Allowance in U.S. Appl. No. 14/600,615, pp. 1-6 (dated Jan. 31, 2017).
Extended European Search Report in European Application No. 13828176.1, pp. 1-7 (dated Jun. 11, 2015).
Notice of Reasons for Rejection in Japanese Application No. 2015524607, pp. 1-12 (dated Feb. 9, 2016).
Office Action in Chinese Application No. 201210278680.4, pp. 1-4 (dated Dec. 31, 2015).
Search Report in Chinese Application No. 201210278680.4, pp. 1-2 (dated Dec. 10, 2015).
International Search Report in International Patent Application No. PCT/CN20131076974, pp. 1-7 (dated Sep. 12, 2013).
Written Opinion of the International Searching Authority in International Application No. PCT/CN2013/076974, pp. 1-6 (dated Sep. 12, 2013).
Office Action in U.S. Appl. No. 15/601,703, pp. 1-10 (dated Sep. 19, 2017).
Notice of Allowance in U.S. Appl. No. 15/601,703, pp. 1-5 (dated Mar. 28, 2018).
U.S. Appl. No. 14/600,615, filed Jan. 20, 2015, Li Wan, Huawei Technologies Co., Ltd.
U.S. Appl. No. 15/601,703, filed May 22, 2017, Li Wan, Huawei Technologies Co., Ltd.
U.S. Appl. No. 16/026,830, filed Jul. 3, 2018.
U.S. Appl. No. 15/601,703, filed May 22, 2017.
U.S. Appl. No. 14/600,615, filed Jan. 20, 2015.

* cited by examiner

METHOD, APPARATUS AND SYSTEM FOR PROCESSING VERY-HIGH-SPEED RANDOM ACCESS

CROSS-REFERENCE TO RELATED APPLICATION

This application is a continuation of U.S. patent application Ser. No. 16/026,830, filed Jul. 3, 2018, which is a continuation of U.S. patent application Ser. No. 15/601,703, filed May 22, 2017, now U.S. Pat. No. 10,039,133, which is a continuation of U.S. patent application Ser. No. 14/600,615, filed Jan. 20, 2015, now U.S. Pat. No. 9,674,872, which is a continuation of International Application No. PCT/CN2013/076974, filed on Jun. 8, 2013, which claims priority to Chinese Patent Application No. 201210278680.4, filed on Aug. 7, 2012. All of the afore-mentioned patent applications are hereby incorporated by reference in their entireties.

TECHNICAL FIELD

The present disclosure relates to the field of mobile communications systems, and in particular, to a method, an apparatus and a system for processing very-high-speed random access.

BACKGROUND

In a Long Term Evolution (LTE) system, a random access channel (RACH) is mainly used for initial access of a user equipment (UE) and does not carry any user data. A signal sent by a UE on an RACH is a preamble sequence, where the preamble sequence is a Zadoff-Chu sequence (ZC sequence). In the prior art, a Preamble may include two parts which are a section of cyclic prefix (CP) with a length of $T_{CP}$ and a section of access sequence (SEQ) with a length of $T_{SEQ}$. In addition, parameter settings of different formats of Preambles may be matched to different cell radii, as shown in Table 1:

TABLE 1

| Preamble sequence format No. | $T_{CP}$ | $T_{SEQ}$ | Maximum cell radius (km) |
| --- | --- | --- | --- |
| 0 | $3168 \cdot T_s$ | $24576 \cdot T_s$ | Approximately 14.6 |
| 1 | $21024 \cdot T_s$ | $24576 \cdot T_s$ | Approximately 77.3 |
| 2 | $6240 \cdot T_s$ | $2 \cdot 24576 \cdot T_s$ | Approximately 29.6 |
| 3 | $21024 \cdot T_s$ | $2 \cdot 24576 \cdot T_s$ | Approximately 100 |
| 4 | $448 \cdot T_s$ | $4096 \cdot T_s$ | Approximately 1.4 | where $T_s$ is a basic time unit in an LTE protocol, and $T_s=1/(15000\times 2048)$s.

In the prior art, a 0-15 km/h low speed scenario is optimized by the LTE system, so that relatively high performance is still achieved in a 15-120 km/h high speed movement scenario, and connection can still be maintained in a 120-350 km/h high speed movement scenario. In an existing LTE protocol, two cell configurations, an unrestricted cell configuration and a restricted cell configuration, are supported, where an unrestricted cell is applied to a low frequency deviation scenario (for example, the frequency deviation is less than 600 Hz), and a restricted cell is applied to a high frequency deviation scenario (for example, the frequency deviation is greater than 600 Hz). With regard to a restricted cell, when a random access signal sent by a UE uses a ZC sequence as a random access sequence, an evolved base station (evolved Node B, NodeB or eNB or e-NodeB) can ensure correct detection of a round trip delay (RTD) within a frequency deviation range where $$\left[-\frac{3*\Delta f_{RA}}{2}, \frac{3*\Delta f_{RA}}{2}\right],$$

$\Delta f_{RA}$ represents a subcarrier spacing of the random access channel, and the UE adjusts a timing advance (TA) according to the RTD, thereby adjusting message sending timing and ensuring that the UE can normally access a network.

With the development of communications technologies and increased communications requirements of users, operators come up with requirements for coverage in very-high-speed movement scenarios and high frequency band high-speed railway scenarios. In the two types of scenarios, a frequency deviation of the random access signal is larger, which is $$\left[-\frac{W*\Delta f_{RA}}{2}, \frac{W*\Delta f_{RA}}{2}\right],$$

where $W\geq 5$. It is very difficult for an eNB to ensure correctness of RTD detection under a high frequency deviation. As a result, it is very difficult to ensure that a UE normally accesses a network, which affects access performance of the network.

SUMMARY

Embodiments of the present invention provide a method, an apparatus and a system for processing very-high-speed random access, so that a user equipment in a very-high-speed movement scenario can normally access a network, so as to improve access performance of the network.

One aspect of the present invention provides a method for processing very-high-speed random access, including: selecting a ZC sequence group according to a cell type and a first cyclic shift parameter Ncs, and setting N detection windows for each ZC sequence in the ZC sequence group, where $N\geq 5$; sending the cell type, a second Ncs, and the ZC sequence group to a user equipment UE, so that the UE selects a random access sequence from the ZC sequence group; receiving a random access signal sent by the UE, and obtaining the random access sequence from the random access signal; and performing correlation processing on the random access sequence with each ZC sequence in the ZC sequence group, detecting a valid peak value in the N detection windows of each ZC sequence, and determining an estimated value of a round trip delay RTD according to the valid peak value.

Another aspect of the present invention provides an apparatus for processing very-high-speed random access, including: a selecting unit, configured to select a ZC sequence group according to a cell type and a first cyclic shift parameter Ncs; a setting unit, configured to set N detection windows for each ZC sequence in the ZC sequence group selected by the selecting unit, where $N\geq 5$; a sending unit, configured to send the cell type, a second Ncs, and the ZC sequence group selected by the selecting unit to a user equipment UE, so that the UE selects a random access sequence from the ZC sequence group; a receiving unit, configured to receive a random access signal sent by the UE and obtain the random access sequence from the random access signal; and a detecting unit, configured to perform correlation processing on the random access sequence obtained by the receiving unit with each ZC sequence in the ZC sequence group, detect a valid peak value in the N detection windows set by the setting unit for each ZC sequence, and determine an estimated value of a round trip delay RTD according to the valid peak value.

It can be known from the above technical solutions that, by using the embodiments of the present invention, a ZC sequence group is selected according to a cell type and a first cyclic shift parameter Ncs, N detection windows are set for each ZC sequence in the ZC sequence group, where N≥5, and an estimated value of the RTD is determined according to a valid peak value detected in the N detection windows of each ZC sequence. In this way, a problem that an RTD of a random access signal cannot be correctly detected in a very-high-speed scenario is solved, it is ensured that a user equipment moving at a very high speed can correctly adjust a TA value according to a detected RTD, and therefore message sending timing is correctly adjusted, so that the user equipment in a very-high-speed scenario can normally access a network, thereby improving access performance of the network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
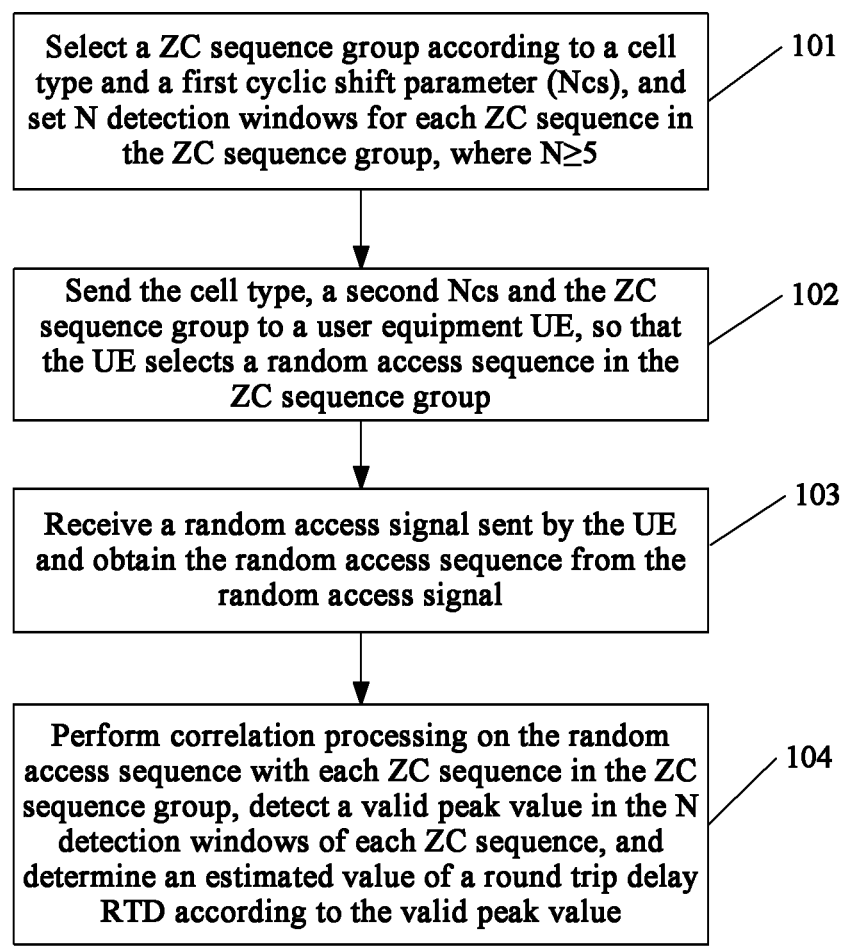
FIG. 1 is a flowchart of a method for processing very-high-speed random access according to an embodiment of the present invention.

As shown in FIG. 1, a method for processing very-high-speed random access according to an embodiment of the present invention is specifically described as follows:

101. Select a ZC sequence group according to a cell type and a first cyclic shift parameter Ncs, and set N detection windows for each ZC sequence in the ZC sequence group, where N≥5.

The cell type includes an unrestricted cell and a restricted cell, and may be configured according to an application scenario. For example, the cell type may be configured to unrestricted cell for a low speed scenario, and configured to restricted cell for a high speed scenario.

The first Ncs is used to represent a cell coverage range, that is, a cell coverage radius. The larger the first Ncs is, the larger the cell coverage range is. Configuration of the first Ncs belongs to the prior art, and therefore is not described herein any further.

The ZC sequence group includes M ZC root sequences, where M≤64. In the 3GPP TS 36.211 protocol, 838 ZC root sequences are defined totally. The ZC sequence group may include 64 ZC root sequences at most.

The setting N detection windows for each ZC sequence in the ZC sequence group may specifically include the following steps.

First, obtain a $du_{HT}$ value of the $i^{th}$ ZC sequence in the ZC sequence group.

The $du_{HT}$ value of the $i^{th}$ ZC sequence refers to a shift of a mirror image peak in a power delay profile PDP of the $i^{th}$ ZC sequence relative to an RTD when a frequency deviation is $$\pm \frac{1}{T_{SEQ}},$$

where $T_{SEQ}$ is a time duration occupied by the $i^{th}$ ZC sequence and a value of i is any integer in [1, M].

The $du_{HT}$ values may be obtained by using a manner A1 or a manner A2.

In the manner A1, the value is obtained by calculation according to Formula 1, which is detailed as follows:

$$du_{HT} = \begin{cases} -p & 0 \le p < N_{ZC}/2 \\ N_{ZC} - p & \text{else} \end{cases} \quad \text{(Formula 1)}$$

where P is a minimum non-negative integer when (p·u) mod $N_{zc}$=1, u is a physical root sequence number of the ZC sequence, and Nzc is a length of the ZC sequence, where the Nzc may be 839 or 139. When Nzc is a fixed value, p is decided by a value of u. Then, according to the above Formula 1, the $du_{HT}$ is decided by the value of u.

For example, if Nzc=839, when the physical root sequence number u=3, (p·3)mod 839=1, p=280, and $du_{HT}$=280 can be obtained according to Formula 1; when the physical root sequence number u=836 (p·836)mod 839=1, p=1119, and, $du_{HT}$=280 can be obtained according to Formula 1.

In the manner A2, the value is obtained by querying Table 2 or Table 3.

Table 2 lists $du_{HT}$(u) values when Nzc=839, where u=1, . . . 419. When u=420, . . . , 838, $du_{HT}$(u) values can be obtained using a formula $du_{HT}$(Nzc−u)=−$du_{HT}$(u), u=1, . . .

, 419. For example, when the physical root sequence number $u=3$, it can be obtained by querying the table that $du_{HT}=-280$; when $u=450$, $Nzc-u=839-450=389$. Let $u'=389$, and then $du_{HT}(Nzc-u')=-du_{HT}(u')=-du_{HT}(u')=-du_{HT}(389)=110$.

TABLE 2

Values of $du_{HT}$ when $N_{ZC} = 839$

| u | $du_{HT}$ |
|---|---|
| 1 | −1 |
| 2 | 419 |
| 3 | −280 |
| 4 | −210 |
| 5 | −168 |
| 6 | −140 |
| 7 | −120 |
| 8 | −105 |
| 9 | −373 |
| 10 | −84 |
| 11 | 305 |
| 12 | −70 |
| 13 | 129 |
| 14 | −60 |
| 15 | −56 |
| 16 | 367 |
| 17 | 148 |
| 18 | 233 |
| 19 | −265 |
| 20 | −42 |
| 21 | −40 |
| 22 | −267 |
| 23 | −73 |
| 24 | −35 |
| 25 | 302 |
| 26 | −355 |
| 27 | −404 |
| 28 | −30 |
| 29 | 405 |
| 30 | −28 |
| 31 | −406 |
| 32 | −236 |
| 33 | −178 |
| 34 | 74 |
| 35 | −24 |
| 36 | −303 |
| 37 | 68 |
| 38 | 287 |
| 39 | 43 |
| 40 | −21 |
| 41 | 266 |
| 42 | −20 |
| 43 | 39 |
| 44 | 286 |
| 45 | 261 |
| 46 | 383 |
| 47 | 357 |
| 48 | 402 |
| 49 | −137 |
| 50 | 151 |
| 51 | 329 |
| 52 | 242 |
| 53 | −95 |
| 54 | −202 |
| 55 | 61 |
| 56 | −15 |
| 57 | −368 |
| 58 | −217 |
| 59 | −128 |
| 60 | −14 |
| 61 | 55 |
| 62 | −203 |
| 63 | −293 |
| 64 | −118 |
| 65 | −142 |
| 66 | −89 |
| 67 | 288 |
| 68 | 37 |
| 69 | −304 |
| 70 | −12 |
| 71 | −130 |
| 72 | 268 |
| 73 | −23 |
| 74 | 34 |
| 75 | −179 |
| 76 | −276 |
| 77 | −316 |
| 78 | −398 |
| 79 | −308 |
| 80 | 409 |
| 81 | 145 |
| 82 | 133 |
| 83 | 374 |
| 84 | −10 |
| 85 | −306 |
| 86 | −400 |
| 87 | 135 |
| 88 | 143 |
| 89 | −66 |
| 90 | −289 |
| 91 | 378 |
| 92 | −228 |
| 93 | −415 |
| 94 | −241 |
| 95 | −53 |
| 96 | 201 |
| 97 | −173 |
| 98 | 351 |
| 99 | −339 |
| 100 | −344 |
| 101 | −108 |
| 102 | −255 |
| 103 | −391 |
| 104 | 121 |
| 105 | −8 |
| 106 | 372 |
| 107 | 345 |
| 108 | −101 |
| 109 | 254 |
| 110 | −389 |
| 111 | −257 |
| 112 | 412 |
| 113 | −297 |
| 114 | −184 |
| 115 | 321 |
| 116 | 311 |
| 117 | 294 |
| 118 | −64 |
| 119 | 141 |
| 120 | −7 |
| 121 | 104 |
| 122 | −392 |
| 123 | −191 |
| 124 | 318 |
| 125 | 396 |
| 126 | 273 |
| 127 | 218 |
| 128 | −59 |
| 129 | 13 |
| 130 | −71 |
| 131 | −269 |
| 132 | 375 |
| 133 | 82 |
| 134 | 144 |
| 135 | 87 |
| 136 | −401 |
| 137 | −49 |
| 138 | −152 |
| 139 | 169 |
| 140 | −6 |
| 141 | 119 |
| 142 | −65 |
| 143 | 88 |
| 144 | 134 |
| 145 | 81 |
| 146 | 408 |

TABLE 2-continued

Values of $du_{HT}$ when $N_{ZC} = 839$

| u | $du_{HT}$ |
|---|---|
| 147 | 234 |
| 148 | 17 |
| 149 | 366 |
| 150 | 330 |
| 151 | 50 |
| 152 | −138 |
| 153 | −170 |
| 154 | −158 |
| 155 | −249 |
| 156 | −199 |
| 157 | 171 |
| 158 | −154 |
| 159 | 248 |
| 160 | −215 |
| 161 | −370 |
| 162 | −347 |
| 163 | 175 |
| 164 | −353 |
| 165 | 300 |
| 166 | 187 |
| 167 | 211 |
| 168 | −5 |
| 169 | 139 |
| 170 | −153 |
| 171 | 157 |
| 172 | −200 |
| 173 | −97 |
| 174 | −352 |
| 175 | 163 |
| 176 | −348 |
| 177 | 237 |
| 178 | −33 |
| 179 | −75 |
| 180 | 275 |
| 181 | 394 |
| 182 | 189 |
| 183 | 298 |
| 184 | −114 |
| 185 | −322 |
| 186 | 212 |
| 187 | 166 |
| 188 | 299 |
| 189 | 182 |
| 190 | 393 |
| 191 | −123 |
| 192 | −319 |
| 193 | −313 |
| 194 | 333 |
| 195 | −327 |
| 196 | −244 |
| 197 | 362 |
| 198 | 250 |
| 199 | −156 |
| 200 | −172 |
| 201 | 96 |
| 202 | −54 |
| 203 | −62 |
| 204 | 292 |
| 205 | 221 |
| 206 | 224 |
| 207 | −381 |
| 208 | −359 |
| 209 | 281 |
| 210 | −4 |
| 211 | 167 |
| 212 | 186 |
| 213 | −323 |
| 214 | −247 |
| 215 | −160 |
| 216 | 369 |
| 217 | −58 |
| 218 | 127 |
| 219 | 272 |
| 220 | 225 |
| 221 | 205 |
| 222 | 291 |
| 223 | −380 |
| 224 | 206 |
| 225 | 220 |
| 226 | 271 |
| 227 | −377 |
| 228 | −92 |
| 229 | 414 |
| 230 | −259 |
| 231 | −385 |
| 232 | −264 |
| 233 | 18 |
| 234 | 147 |
| 235 | 407 |
| 236 | −32 |
| 237 | 177 |
| 238 | −349 |
| 239 | 337 |
| 240 | 416 |
| 241 | −94 |
| 242 | 52 |
| 243 | 328 |
| 244 | −196 |
| 245 | −363 |
| 246 | 324 |
| 247 | −214 |
| 248 | 159 |
| 249 | −155 |
| 250 | 198 |
| 251 | 361 |
| 252 | −283 |
| 253 | −388 |
| 254 | 109 |
| 255 | −102 |
| 256 | 390 |
| 257 | −111 |
| 258 | −413 |
| 259 | −230 |
| 260 | 384 |
| 261 | 45 |
| 262 | 285 |
| 263 | 386 |
| 264 | −232 |
| 265 | −19 |
| 266 | 41 |
| 267 | −22 |
| 268 | 72 |
| 269 | −131 |
| 270 | −376 |
| 271 | 226 |
| 272 | 219 |
| 273 | 126 |
| 274 | 395 |
| 275 | 180 |
| 276 | −76 |
| 277 | 315 |
| 278 | −335 |
| 279 | −418 |
| 280 | −3 |
| 281 | 209 |
| 282 | −360 |
| 283 | −252 |
| 284 | 387 |
| 285 | 262 |
| 286 | 44 |
| 287 | 38 |
| 288 | 67 |
| 289 | −90 |
| 290 | −379 |
| 291 | 222 |
| 292 | 204 |
| 293 | −63 |
| 294 | 117 |
| 295 | 310 |
| 296 | −411 |
| 297 | −113 |
| 298 | 183 |

TABLE 2-continued

Values of $du_{HT}$ when $N_{ZC} = 839$

| u | $du_{HT}$ |
|---|---|
| 299 | 188 |
| 300 | 165 |
| 301 | −354 |
| 302 | 25 |
| 303 | −36 |
| 304 | −69 |
| 305 | 11 |
| 306 | −85 |
| 307 | 399 |
| 308 | −79 |
| 309 | −410 |
| 310 | 295 |
| 311 | 116 |
| 312 | 320 |
| 313 | −193 |
| 314 | −334 |
| 315 | 277 |
| 316 | −77 |
| 317 | 397 |
| 318 | 124 |
| 319 | −192 |
| 320 | 312 |
| 321 | 115 |
| 322 | −185 |
| 323 | −213 |
| 324 | 246 |
| 325 | −364 |
| 326 | −332 |
| 327 | −195 |
| 328 | 243 |
| 329 | 51 |
| 330 | 150 |
| 331 | 365 |
| 332 | −326 |
| 333 | 194 |
| 334 | −314 |
| 335 | −278 |
| 336 | 417 |
| 337 | 239 |
| 338 | −350 |
| 339 | −99 |
| 340 | 343 |
| 341 | −342 |
| 342 | −341 |
| 343 | 340 |
| 344 | −100 |
| 345 | 107 |
| 346 | 371 |
| 347 | −162 |
| 348 | −176 |
| 349 | −238 |
| 350 | −338 |
| 351 | 98 |
| 352 | −174 |
| 353 | −164 |
| 354 | −301 |
| 355 | −26 |
| 356 | 403 |
| 357 | 47 |
| 358 | 382 |
| 359 | −208 |
| 360 | −282 |
| 361 | 251 |
| 362 | 197 |
| 363 | −245 |
| 364 | −325 |
| 365 | 331 |
| 366 | 149 |
| 367 | 16 |
| 368 | −57 |
| 369 | 216 |
| 370 | −161 |
| 371 | 346 |
| 372 | 106 |
| 373 | −9 |
| 374 | 83 |
| 375 | 132 |
| 376 | −270 |
| 377 | −227 |
| 378 | 91 |
| 379 | −290 |
| 380 | −223 |
| 381 | −207 |
| 382 | 358 |
| 383 | 46 |
| 384 | 260 |
| 385 | −231 |
| 386 | 263 |
| 387 | 284 |
| 388 | −253 |
| 389 | −110 |
| 390 | 256 |
| 391 | −103 |
| 392 | −122 |
| 393 | 190 |
| 394 | 181 |
| 395 | 274 |
| 396 | 125 |
| 397 | 317 |
| 398 | −78 |
| 399 | 307 |
| 400 | −86 |
| 401 | −136 |
| 402 | 48 |
| 403 | 356 |
| 404 | −27 |
| 405 | 29 |
| 406 | −31 |
| 407 | 235 |
| 408 | 146 |
| 409 | 80 |
| 410 | −309 |
| 411 | −296 |
| 412 | 112 |
| 413 | −258 |
| 414 | 229 |
| 415 | −93 |
| 416 | 240 |
| 417 | 336 |
| 418 | −279 |
| 419 | 2 |

Table 3 lists $du_{HT}(u)$ values when Nzc=139, where u=1, . . . , 69. When u=70, . . . , 138, $du_{HT}(u)$ values can be obtained using a formula $du_{HT}(Nzu-u)=-du_{HT}(u)$, u=1, . . . , 69.

TABLE 3

Values of $du_{HT}$ when $N_{ZC} = 139$

| u | $du_{HT}$ |
|---|---|
| 1 | −1 |
| 2 | 69 |
| 3 | 46 |
| 4 | −35 |
| 5 | −28 |
| 6 | 23 |
| 7 | −20 |
| 8 | 52 |
| 9 | −31 |
| 10 | −14 |
| 11 | −38 |
| 12 | −58 |
| 13 | 32 |
| 14 | −10 |
| 15 | 37 |
| 16 | 26 |
| 17 | 49 |

TABLE 3-continued

Values of $du_{HT}$ when $N_{ZC} = 139$

| u | $du_{HT}$ |
|---|---|
| 18 | 54 |
| 19 | -22 |
| 20 | -7 |
| 21 | -53 |
| 22 | -19 |
| 23 | 6 |
| 24 | -29 |
| 25 | 50 |
| 26 | 16 |
| 27 | 36 |
| 28 | -5 |
| 29 | -24 |
| 30 | -51 |
| 31 | -9 |
| 32 | 13 |
| 33 | -59 |
| 34 | -45 |
| 35 | -4 |
| 36 | 27 |
| 37 | 15 |
| 38 | -11 |
| 39 | 57 |
| 40 | 66 |
| 41 | 61 |
| 42 | 43 |
| 43 | 42 |
| 44 | 60 |
| 45 | -34 |
| 46 | 3 |
| 47 | 68 |
| 48 | 55 |
| 49 | 17 |
| 50 | 25 |
| 51 | -30 |
| 52 | 8 |
| 53 | -21 |
| 54 | 18 |
| 55 | 48 |
| 56 | 67 |
| 57 | 39 |
| 58 | -12 |
| 59 | -33 |
| 60 | 44 |
| 61 | 41 |
| 62 | 65 |
| 63 | -64 |
| 64 | -63 |
| 65 | 62 |
| 66 | 40 |
| 67 | 56 |
| 68 | 47 |
| 69 | 2 |

Then, determine start positions of the N detection windows of the $i^{th}$ ZC sequence according to the $du_{HT}$ value of the $i^{th}$ ZC sequence.

The number N of detection windows may be preset inside a base station according to a frequency deviation range, or may be dynamically configured to the base station on an operation and maintenance console.

For example, as an embodiment, when the frequency deviation range is $$\left[-\frac{5*\Delta f_{RA}}{2}, \frac{5*\Delta f_{RA}}{2}\right],$$

the number of detection windows of the ZC sequence may be configured to five, and, however, the number of detection windows of the ZC sequence may also be configured to more than five. When the frequency deviation range is $$\left[-\frac{W*\Delta f_{RA}}{2}, \frac{W*\Delta f_{RA}}{2}\right]$$

and W>5, the number N of detection windows of the ZC sequence may be configured to W, and the number N of detection windows of the ZC sequence may also be configured to more than W.

Finally, set the N detection windows of the $i^{th}$ ZC sequence according to start positions of the N detection windows of the $i^{th}$ ZC sequence and a preset size of a detection window.

The size of a detection window may be preset according to the cell radius, and the window size is no less than an RTD corresponding to the cell radius. For example, based on the RTD corresponding to the cell radius, the detection window may be expanded according to a multipath delay.

102. Send the cell type, a second Ncs, and the ZC sequence group to a user equipment UE, so that the UE selects a random access sequence from the ZC sequence group.

The second Ncs refers to an index value that can ensure that the UE uses the ZC root sequence in the ZC sequence group as a random access sequence. For example, two configuration manners in the following may be used.

Manner 1: When the cell type is configured to unrestricted cell (or low-speed cell), the second Ncs index is 0.

Manner 2: When the cell type is configured to restricted cell (or high-speed cell), the second Ncs index is 14.

In manner 2, the second Ncs index is not limited to 14, and may be any other index that enables the UE to use a ZC sequence which does not shift cyclically as the random access sequence, so as to reduce an overlap probability of the N detection windows of the ZC sequence. The second Ncs may be set inside the base station, or determined according to the configured cell type inside the base station, or obtained by querying a table, and is sent to the UE in a system message.

It should be noted that the first Ncs in step 101 is set according to the cell coverage range, and reflects the cell coverage radius. The second Ncs in step 102 is only used to be sent to the UE, so that the UE uses the ZC root sequence in the ZC sequence group as the random access sequence rather than uses a ZC sequence that shifts cyclically as the random access sequence, which can reduce the overlap probability of the N detection windows. If the index value of the first Ncs in step 101 meets a condition of enabling the UE to use the ZC sequence which does not shift cyclically as the random access sequence, the first Ncs and the second Ncs may be the same.

Partial ZC sequences in the ZC sequence group are used for contention access, and partial ZC sequences are used for contention-free access. For contention access, the UE randomly selects one ZC sequence from ZC sequences used for contention access in the ZC sequence group as the random access sequence. For contention-free access, the base station indicates to the UE which ZC sequence in the ZC sequence group is to be used as the random access sequence.

103. Receive a random access signal sent by the UE, and obtain the random access sequence from the random access signal.

104. Perform correlation processing (correlation) on the random access sequence with each ZC sequence in the ZC sequence group, detect a valid peak value in the N detection windows of each ZC sequence, and determine an estimated value of a round trip delay RTD according to the valid peak value.

The valid peak value is obtained by determining a maximum peak value in each detection window and a position of the maximum peak value in each detection window, and is specifically described as follows:

When only one maximum peak value is greater than a detection threshold, the peak value greater than the detection threshold is selected as the valid peak value. The valid peak value may also be called a primary peak value.

When two or more than two maximum peak values are greater than the detection threshold, whether absolute positions of the two maximum peak values overlap is determined. If the absolute positions do not overlap, the two maximum peak values are selected as valid peak values, where a greater valid peak value in the two valid peak values is called a primary peak value and a smaller valid peak value in the two valid peak values is called a secondary peak value. If the absolute positions overlap, the two maximum peak values are the same peak value and used as the primary peak value, and a maximum peak value greater than the detection threshold detected in a detection window corresponding to a spacing of the frequency deviation of the detection window in which the primary peak value is located plus 1 or the frequency deviation minus 1 RACH subcarriers is a secondary peak value.

The detection threshold may be set according to a false-alarm performance requirement under discontinuous transmission.

The estimated value of the RTD is a deviation of the valid peak value relative to a start position of a detection window in which the valid peak value is located. If the start position of the detection window in which the valid peak value is located is shifted based on the start position determined according to the $du_{HT}$ value of the ZC sequence, the estimated value of the RTD may be obtained according to a deviation value of the valid peak value relative to the start position of the detection window in which the valid peak value is located, a shift direction and shift sampling points, which is specifically described as follows:

Assuming that the start position of the detection window in which the valid peak value is located shifts left by preset sampling points, the estimated value of the RTD is a deviation value of the valid peak value relative to the start position of the detection window in which the valid peak value is located minus the number of the preset sampling points. Assuming that the start position of the detection window in which the valid peak value is located shifts right by the preset sampling points, the estimated value of the RTD is a deviation value of the valid peak value relative to the start position of the detection window in which the valid peak value is located plus the number of the preset sampling points.

By using the method for processing very-high-speed random access provided by the foregoing embodiment, a problem that an RTD of a random access signal cannot be correctly detected in a very-high-speed scenario is solved, it is ensured that a user equipment moving at a very high speed can correctly adjust a TA value according to a detected RTD, and therefore message sending timing is correctly adjusted, so that the user equipment in a very-high-speed scenario can normally access a network, thereby improving access performance of the network.

Figure 2:
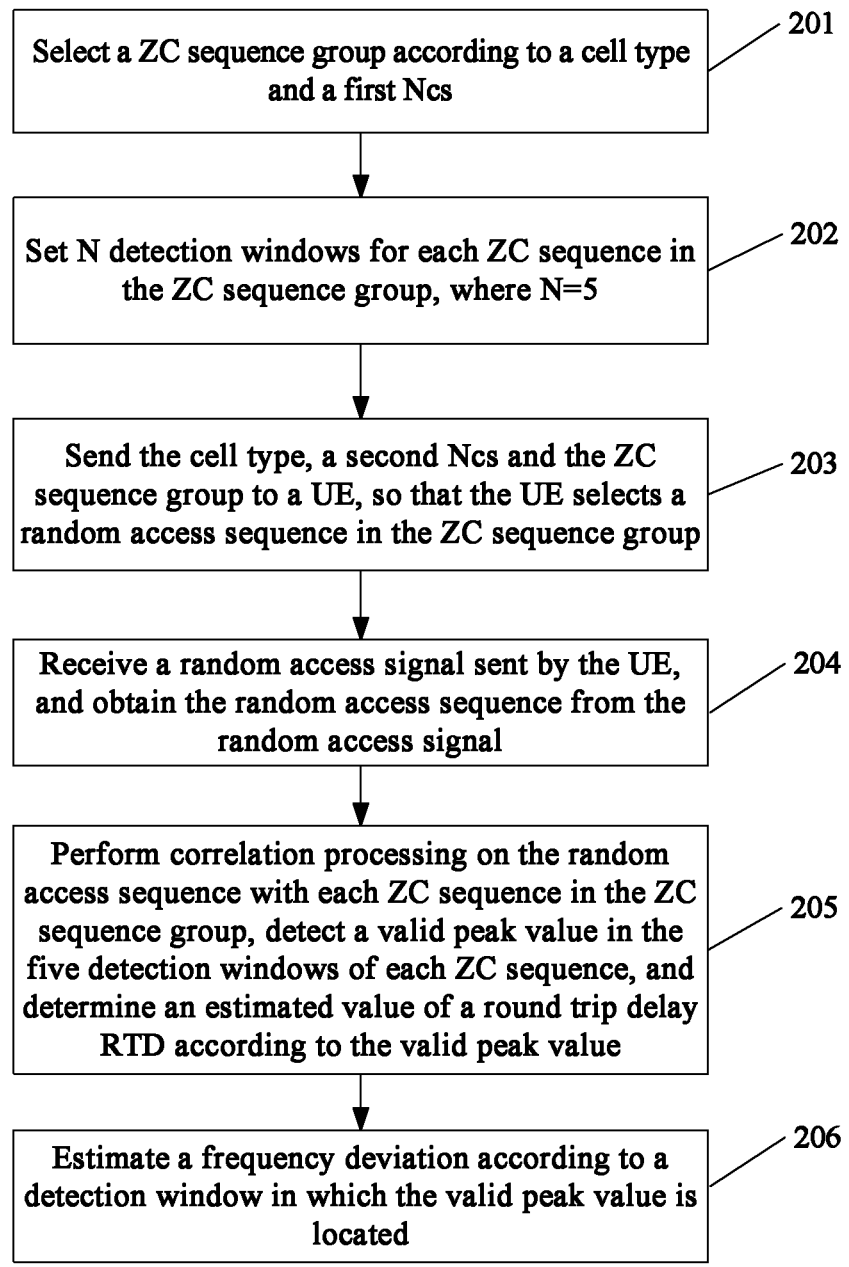
FIG. 2 is a flowchart of another method for processing very-high-speed random access according to an embodiment of the present invention.

As shown in FIG. 2, a method for processing very-high-speed random access according to an embodiment of the present invention, where N detection windows are set for each ZC sequence in a ZC sequence group when a frequency deviation range of very-high-speed random access is $$\left[-\frac{5*\Delta f_{RA}}{2}, \frac{5*\Delta f_{RA}}{2}\right],$$

where N=5, is specifically described as follows:

201. Select a ZC sequence group according to a cell type and a first Ncs.

For relevant descriptions of the cell type and the first Ncs as well as the ZC sequence group, refer to step 101.

The selecting a ZC sequence group according to a cell type and a first Ncs is specifically described as follows:

B1. Select the ZC sequence group according to the cell type and the first Ncs.

B2. Determine whether a $du_{HT}$ value of each ZC sequence in the ZC sequence group meets a condition $$|du_{HT}| \in \left[Ncs, \frac{Nzc-Ncs}{4}\right] \cup \left[\frac{Nzc+Ncs}{4}, \frac{Nzc-Ncs}{3}\right] \cup \left[\frac{Nzc+Ncs}{3}, \frac{Nzc-Ncs}{2}\right],$$

where Nzc is a length of each ZC sequence, and Ncs refers to the first Ncs;

if the $du_{HT}$ value of at least one ZC sequence in the ZC sequence group does not meet the condition, return to step B1; and if $du_{HT}$ values of the ZC sequences in the ZC sequence group all meet the condition, send the ZC sequence group to a user equipment;

where, for an obtaining manner of the $du_{HT}$ value, reference may be made to relevant descriptions in step 101.

It should be noted that, when the $du_{HT}$ value of each ZC sequence in the selected ZC sequence group meets the condition $$|du_{HT}| \in \left[Ncs, \frac{Nzc-Ncs}{4}\right] \cup \left[\frac{Nzc+Ncs}{4}, \frac{Nzc-Ncs}{3}\right] \cup \left[\frac{Nzc+Ncs}{3}, \frac{Nzc-Ncs}{2}\right],$$

the five detection windows set according to the $du_{HT}$ value of each ZC sequence do not overlap, which improves correctness of RTD estimation.

For example, assuming that the cell type is restricted cell, the first Ncs set according to a cell radius is 15, the selected ZC sequence group includes 64 ZC sequences, and a length of a ZC sequence is 839, a method for selecting the ZC sequence group according to the cell type and the first Ncs is described with an example as follows:

First, select logical root sequence numbers of the 64 ZC sequences according to the cell type and the first Ncs.

Table 4 is a mapping table between Ncs values and logical root sequence numbers of a restricted cell. The first column includes two Ncs values of 15, where a first logical root sequence number corresponding to the first Ncs of 15 is 24, and a second logical root sequence number corresponding to the second Ncs of 15 is 819. Therefore, available logical root sequence numbers are [24, 819] when the first Ncs is 15.

TABLE 4

Mapping table between Ncs values and logical root sequence numbers of a restricted cell

| $N_{CS}$ value (restricted cell) | Logical root sequence number |
|---|---|
| — | 0-23 |
| 15 | 24-29 |
| 18 | 30-35 |
| 22 | 36-41 |
| 26 | 42-51 |
| 32 | 52-63 |
| 38 | 64-75 |
| 46 | 76-89 |
| 55 | 90-115 |
| 68 | 116-135 |
| 82 | 136-167 |
| 100 | 168-203 |
| 128 | 204-263 |
| 158 | 264-327 |
| 202 | 328-383 |
| 237 | 384-455 |
| 237 | 456-513 |
| 202 | 514-561 |
| 158 | 562-629 |
| 128 | 630-659 |

TABLE 4-continued

Mapping table between Ncs values and logical root sequence numbers of a restricted cell

| $N_{CS}$ value (restricted cell) | Logical root sequence number |
|---|---|
| 100 | 660-707 |
| 82 | 708-729 |
| 68 | 730-751 |
| 55 | 752-765 |
| 46 | 766-777 |
| 38 | 778-789 |
| 32 | 790-795 |
| 26 | 796-803 |
| 22 | 804-809 |
| 18 | 810-815 |
| 15 | 816-819 |
| — | 820-837 |

Then, obtain the physical root sequence numbers of the 64 ZC sequences according to a mapping table between the logical root sequence numbers and the physical root sequence numbers.

Table 5 provides the mapping between partial logical root sequence numbers and partial physical root sequence numbers.

TABLE 5

Mapping table between logical root sequence numbers and physical root sequence numbers

| Logical root sequence number (Logical root sequence number) | Physical root sequence number (Physical root sequence number u) |
|---|---|
| 0-23 | 129, 710, 140, 699, 120, 719, 210, 629, 168, 671, 84, 755, 105, 734, 93, 746, 70, 769, 60, 7792, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| . . . | . . . |

If the selected logical root sequence number is 384, the physical root sequence numbers of the 64 ZC sequences may be obtained according to the mapping between the logical root sequence numbers and the physical root sequence numbers in Table 5 as follows: 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713.

Then, obtain $du_{HT}$ values of the 64 ZC sequences.

According to relevant descriptions and obtaining method of $du_{HT}$ in step 101, it may be obtained that: when the physical root sequence number u=3, $du_{HT}$=−280; when the physical root sequence number u=836, $du_{HT}$=280; and when the physical root sequence number u=19, $du_{HT}$=265, . . . .

Finally, determine whether the $du_{HT}$ values of the selected 64 ZC sequences all meet a condition $$|du_{HT}| \in \left[Ncs, \frac{Nzc - Ncs}{4}\right] \cup \left[\frac{Nzc + Ncs}{4}, \frac{Nzc - Ncs}{3}\right] \cup \left[\frac{Nzc + Ncs}{3}, \frac{Nzc - Ncs}{2}\right].$$

If the condition is not met, reselect the ZC sequence group.

$|du_{HT}| \in [15,206] \cup [213,274] \cup [284,412]$ is worked out by calculating according to the first Ncs and Nzc. In the selected 64 ZC sequences, when the physical root sequence numbers are 3 and 836, the $du_{HT}$ values do not meet the $du_{HT}$ value condition. Therefore, reselect 64 ZC sequences according to the selecting step of the ZC sequence group.

Assuming that the physical root sequence numbers of the reselected 64 ZC sequences are 56, 783, 112, 727, 148, 691, 80, 759, 42, 797, 40, 799, 35, 804, 73, 766, 146, 693, 31, 808, 28, 811, 30, 809, 29, 810, 27, 812, 24, 815, 48, 791, 68, 771, 74, 765, 178, 661, 136, 703, 86, 753, 78, 761, 43, 796, 39, 800, 20, 819, 21, 818, 95, 744, 202, 637, 190, 649, 181, 658, 137, 702, 125, 714, obtain $du_{HT}$ values and determine that the $du_{HT}$ values of the reselected 64 ZC sequences meet the $du_{HT}$ condition.

202. Set N detection windows for each ZC sequence in the ZC sequence group, where N=5.

When the ZC sequence group includes M ZC sequences, the setting N detection windows for each ZC sequence in the ZC sequence group, where N=5, is specifically described as follows:

C1. Obtain a $du_{HT}$ value of an $i^{th}$ ZC sequence in the ZC sequence group.

The $du_{HT}$ value of the $i^{th}$ ZC sequence refers to a shift of a mirror image peak in a power delay profile PDP of the $i^{th}$ ZC sequence relative to the RTD when a frequency deviation is $$\pm \frac{1}{T_{SEQ}},$$

where $T_{SEQ}$ is a time duration occupied by the $i^{th}$ ZC sequence and a value of i is any integer in [1, M].

C2. Set five detection windows of the $i^{th}$ ZC sequence according to the $du_{HT}$ value of the $i^{th}$ ZC sequence.

First, obtain start positions of the five detection windows of the $i^{th}$ ZC sequence according to the $du_{HT}$ value of the $i^{th}$ ZC sequence.

The five detection windows of the $i^{th}$ ZC sequence are a detection window ①, a detection window ②, a detection window ③, a detection window ④ and a detection window ⑤, respectively. The five detection windows ①, ②, ③, ④ and ⑤ respectively correspond to frequency deviations 0, $-\Delta f_{RA}$, $+\Delta f_{RA}$, $-2\Delta f_{RA}$ and $+2\Delta f_A$. The details are as follows:

a start position of the detection window ① is 0;

a start position of the detection window ② is mod($du_{HT}$, Nzc);

a start position of the detection window ③ is mod($-du_{HT}$, Nzc);

a start position of the detection window ④ is mod (2*$du_{HT}$, Nzc); and a start position of the detection window ⑤ is mod(-2*$du_{HT}$, Nzc);

where mod($du_{HT}$, Nzc) means $du_{HT}$ mod Nzc, Nzc is a length of the $i^{th}$ ZC sequence, and for an obtaining manner of the $du_{HT}$ value, reference may be made to step 101.

Then, set the five detection windows of the $i^{th}$ ZC sequence according to the start positions of the five detection windows and a preset size of a detection window.

The size of the detection window is consistent with relevant descriptions in step 101. The start position of the detection window may be shifted according to preset sampling points, so as to adapt to earlier or later transmission of a random access signal by a UE.

203. Send the cell type, a second Ncs, and the ZC sequence group to a UE, so that the UE selects a random access sequence from the ZC sequence group.

For relevant descriptions of the second Ncs, refer to step 102.

204. Receive a random access signal sent by the UE, and obtain the random access sequence from the random access signal.

205. Perform correlation processing on the random access sequence with each ZC sequence in the ZC sequence group, detect a valid peak value in the five detection windows of each ZC sequence, and determine an estimated value of an RTD according to the valid peak value.

The valid peak value and the estimated value of the RTD are consistent with relevant descriptions in step 104.

The determining the RTD according to the valid peak value may be obtained by using two methods as follows:

Method (1): Directly obtain the estimated value of the RTD according to a deviation of a primary peak value relative to a start position of a primary peak value detection window.

Method (2): Select and merge data of at least two detection windows according to a preset principle to obtain a new valid peak value, and estimate the RTD.

In the method (2), according to the preset principle, detection windows at two sides of the primary peak value may be merged, or a detection window in which the primary peak value is located and a detection window in which a secondary peak value is located may be merged, or all the detection windows may be merged. Since the detection windows are merged, a detection threshold of the valid peak value is increased accordingly. Therefore, a new valid peak value may be obtained, and the RTD may be estimated according to the obtained new effective value.

206. Estimate a frequency deviation according to a detection window in which the valid peak value is located.

An estimated value of the frequency deviation is used for rectifying a deviation of an uplink signal of the UE and demodulating a Message 3 message sent by the UE. The Message 3 carries an identifier of the UE.

Figure 3:
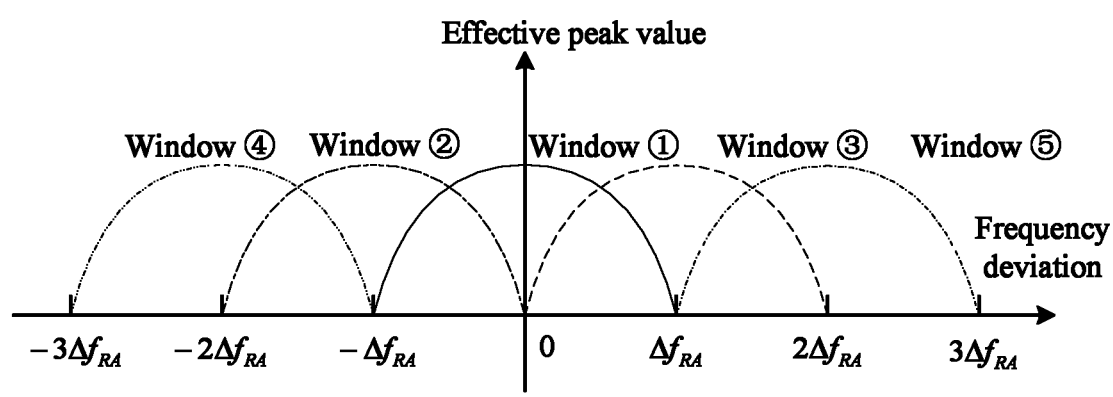
FIG. 3 is a schematic diagram illustrating changing of a valid peak value with frequency deviations in detection windows according to an embodiment of the present invention.

FIG. 3 is a schematic diagram illustrating changing of a valid peak value with frequency deviations in detection windows. The estimating a frequency deviation according to a detection window in which the valid peak value is located specifically includes three cases as follows:

Case 1: When two valid peak values exist, if a primary peak value is located in a detection window ① and a secondary peak value is located in a detection window ③, a frequency deviation of an uplink signal of a UE may be estimated to be a value within a range of 0 to ½Δf$_{RA}$ according to the schematic diagram of the peak values in each window changing with the frequency deviation as shown in FIG. 3. If a maximum peak value is in the detection window ③ and a second maximum peak value is in a detection window ⑤, the frequency deviation of the uplink signal of the UE is estimated to be a value within a range of Δf$_{RA}$ to ³⁄₂Δf$_{RA}$; and so on.

Case 2: If two valid peak values exist and are close, where one is located in the detection window ① and the other is located in the detection window ③, the frequency deviation of the uplink signal of the UE is estimated to be about ½Δf$_{RA}$; if two valid peak values exist and are close, where one is located in the detection window ③ and the other is located in the detection window ⑤, the frequency deviation of the uplink signal of the UE is estimated to be about 3/2Δf$_{RA}$; and so on.

Case 3: If one valid peak value exists and is located in the detection window ①, the frequency deviation of the uplink signal of the UE is estimated to be 0; if one valid peak value exists and is located in the detection window ②, the frequency deviation of the uplink signal of the UE is estimated to be −Δf$_{RA}$; if one valid peak value exists and is located in the detection window ④, the frequency deviation of the uplink signal of the UE is estimated to be −2Δf$_{RA}$; and so on.

It should be noted that step 205 is optional. To be specific, the frequency deviation is not estimated. Instead, a Message 3 is demodulated by grades according to a frequency deviation range. For example, when the frequency deviation range is [−3 KHz, 3 KHz], demodulation may be performed by six grades, where 1 KHz is a grade.

In the method for processing very-high-speed random access provided by the foregoing embodiment, a ZC sequence group is selected according to a cell type and a first Ncs, it is ensured that du$_{HT}$ values of ZC sequences in the ZC sequence group meet a condition $$|du_{HT}| \in \left[Ncs, \frac{Nzc - Ncs}{4}\right] \cup$$
$$\left[\frac{Nzc + Ncs}{4}, \frac{Nzc - Ncs}{3}\right] \cup \left[\frac{Nzc + Ncs}{3}, \frac{Nzc - Ncs}{2}\right],$$

N non-overlap detection windows are set for each ZC sequence in the ZC sequence group according to the du$_{HT}$ value of each ZC sequence in the ZC sequence group, where N=5, the valid peak values in the non-overlap detection windows are detected, and a round trip delay is determined. In this way, not only a problem of access of a UE to a network in a very-high-speed scenario where the frequency deviation range is $$\left[-\frac{5 * \Delta f_{RA}}{2}, \frac{5 * \Delta f_{RA}}{2}\right]$$

is solved, but also correctness of an estimated value of the RTD is improved.

Figure 4:
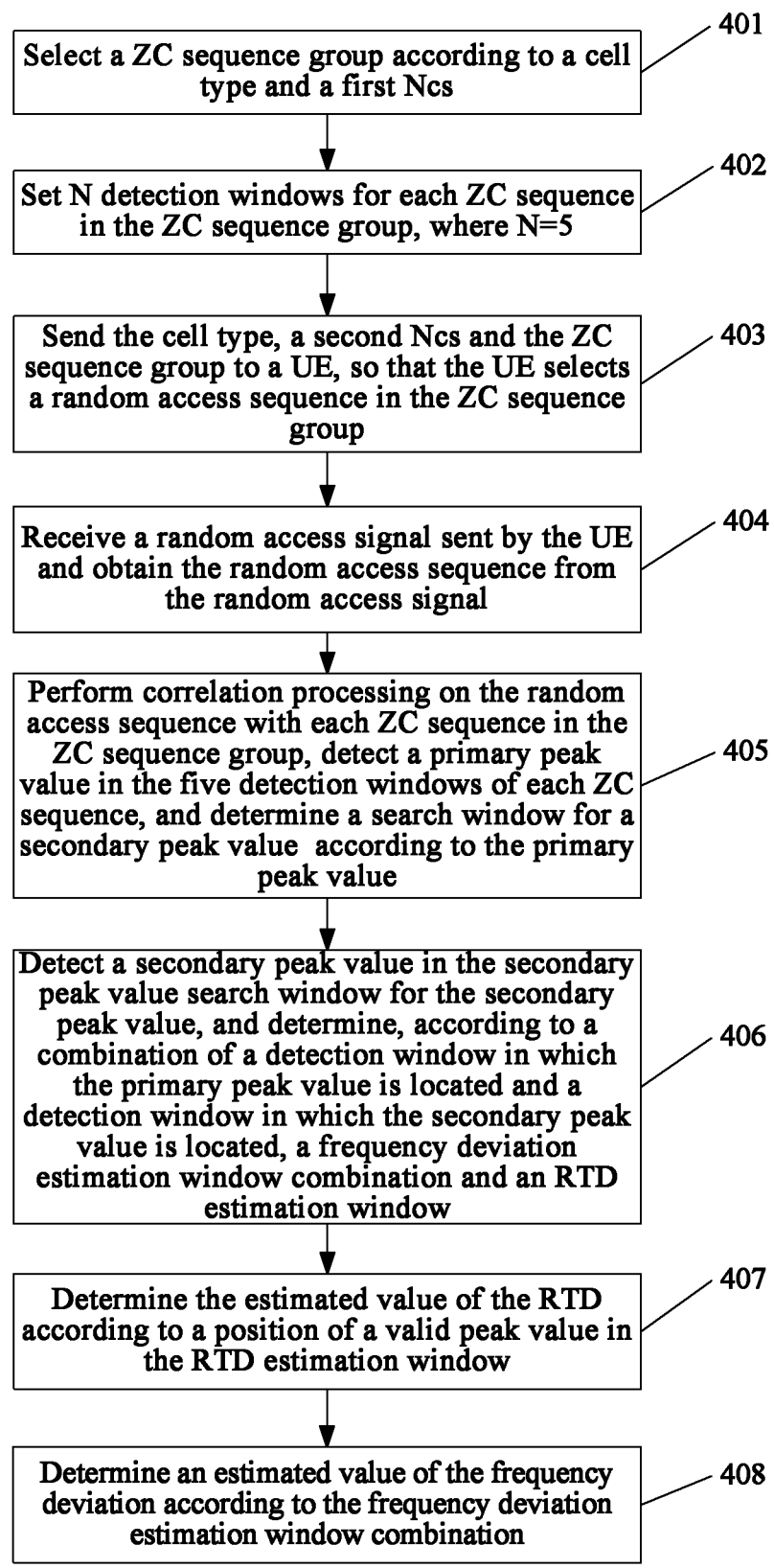
FIG. 4 is a flowchart of another method for processing very-high-speed random access according to an embodiment of the present invention.

As shown in FIG. 4, a method for processing very-high-speed random access according to an embodiment of the present invention, where N detection windows are set for each ZC sequence in a ZC sequence group when a frequency deviation range of the very-high-speed random access is $$\left[-\frac{5 * \Delta f_{RA}}{2}, \frac{5 * \Delta f_{RA}}{2}\right],$$

where N=5, is specifically described as follows:

401. Select a ZC sequence group according to a cell type and a first Ncs.

The cell type is a restricted cell, and the first Ncs represents a coverage range of the restricted cell.

Selection of the ZC sequence group may be obtained according to a selecting principle for root sequences of the restricted cell in the prior art, and therefore is not described herein any further.

402. Set N detection windows for each ZC sequence in the ZC sequence group, where N=5.

For relevant descriptions of the setting N detection windows for each ZC sequence in the ZC sequence group, reference may be made to step 202.

403. Send the cell type, a second Ncs, and the ZC sequence group to a UE, so that the UE selects a random access sequence from the ZC sequence group.

For relevant descriptions of the second Ncs, refer to step 102.

404. Receive a random access signal sent by the UE, and obtain the random access sequence from the random access signal.

405. Perform correlation processing on the random access sequence with each ZC sequence in the ZC sequence group, detect a primary peak value in the five detection windows of each ZC sequence, and determine a search window for a secondary peak value according to the primary peak value.

Search one maximum peak value in each of the five detection windows of each ZC sequence, and determine whether absolute positions of two maximum peak values in the five maximum peak values overlap. If the absolute positions do not overlap, select a greater maximum peak value of the two maximum peak values as the primary peak value. If the absolute positions overlap, select windows in which the two maximum peak values are located as windows in which the primary peak value is located. For example, when the primary peak value appears in an overlap between two detection windows, the primary peak value is detected separately in the two detection windows, that is, the same peak value is detected twice. Therefore, whether the peak values are the same peak value may be determined by determining whether the absolution positions of the two maximum peak values overlap.

TABLE 6

Search window for secondary peak value

| Window where the primary peak value is located | Search window for secondary peak value |
|---|---|
| ① | ②③ |
| ② | ①④ |
| ③ | ①⑤ |
| ④ | ② |

TABLE 6-continued

Search window for secondary peak value

| Window where the primary peak value is located | Search window for secondary peak value |
|---|---|
|  |  |

For example, assuming that the primary peak value appears in an overlap between a detection window ④ and a detection window ⑤, it can be known by referring to Table 6 that search windows for the secondary peak value are a window ② and a window ③.

406. Detect a secondary peak value in the search window for the secondary peak value, and determine, according to a combination of the detection window in which the primary peak value is located and a detection window in which the secondary peak value is located, a frequency deviation estimation window combination and an RTD estimation window.

Detect a secondary peak value in the search window for the secondary peak value. To be specific, find one maximum peak value in the search window for each secondary peak value, compare the maximum peak values, and select a greatest one which is greater than a detection threshold as the secondary peak value.

Determine the frequency deviation estimation window combination and the RTD estimation window by querying Table 7 according to the window in which the secondary peak value is located and the window in which the primary peak value is located.

For example, assuming that the primary peak value appears in an overlap between the detection window ④ and the detection window ⑤, it can be known by referring to Table 7 that the secondary peak value is searched in the window ② and the window ③. When the secondary peak value is found in the detection window ②, the combination of detection windows after two peak value searches is ②, ④ and ⑤. It can be known by referring to Table 7 that the detection window ④ is selected to estimate the RTD, and the detection windows ② and ④ are selected to estimate the frequency deviation. When the secondary peak value is found in the detection window ③, a combination of detection windows after two peak value searches is ③, ④ and ⑤. It can be known by referring to Table 7 that the detection window ⑤ is selected to estimate the RTD, and the detection windows ③ and ⑤ are selected to estimate the frequency deviation.

TABLE 7

Frequency deviation estimation window combination and RTD estimation window

| Window combination after two peak value searches | Frequency deviation estimation window combination | RTD estimation window |
|---|---|---|
| 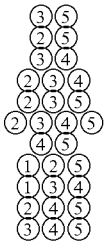 | Invariant | Single window itself |
|  | | Window in which the primary peak value is located |

TABLE 7-continued

Frequency deviation estimation window combination and RTD estimation window

| Window combination after two peak value searches | Frequency deviation estimation window combination | RTD estimation window |
|---|---|---|
|  | fail | — |
|  |  |  |

It should be noted that, if the frequency deviation estimation window combination shows fail, no user is detected in the detection windows of the ZC sequence. Otherwise, the RTD is estimated according to a designated RTD estimation window.

407. Determine the estimated value of the RTD according to a position of the valid peak value in the RTD estimation window.

The estimated value of the RTD is a deviation of the valid peak value in the RTD estimation window relative to a start position of the RTD estimation window. If the start position of the RTD estimation window is obtained by shifting preset sampling points, the estimated value of the RTD is a deviation value of the valid peak value in the RTD estimation window relative to the start position of the RTD estimation window plus or minus the number of the preset sampling points. The details are as follows.

Assuming that the start position of the RTD estimation window shifts left by the preset sampling points, the estimated value of the RTD is the deviation value of the start position of the RTD estimation window minus the number of the preset sampling points. Assuming that the start position of the RTD estimation window shifts right by the preset sampling points, the estimated value of the RTD is the deviation value of the start position of the RTD estimation window plus the number of the preset sampling points.

408. Determine an estimated value of the frequency deviation according to the frequency deviation estimation window combination.

For how to determine the estimated value of the frequency deviation according to the frequency deviation estimation window combination, reference may be made to relevant descriptions in step 206.

The estimated value of the frequency deviation is used for rectifying a deviation of an uplink signal of the UE, thereby demodulating a Message 3.

It should be noted that step 408 is optional. To be specific, the frequency deviation may not be estimated. Instead, a Message 3 is demodulated by grades according to a frequency deviation range. For example, when the frequency deviation range is [−3 KHz, 3 KHz], demodulation may be performed by six grades, where 1 KHz is a grade.

In the method for processing very-high-speed random access provided by the foregoing embodiment, a principle of selecting the ZC sequence for the restricted cell in the prior art is used to select a ZC sequence group, the five detection windows is set for each ZC sequence in the ZC sequence group, the valid peak value in the five detection windows of each ZC sequence is detected, and an RTD estimation window is determined according to a combination of the detection window in which the primary peak value is located and the detection window in which the secondary peak value is located, so that the estimated value of the RTD is determined. In this way, a problem of detecting the RTD when the valid peak value appears in the overlap between detection windows is solved, and processing of the random access signal in a very-high-speed movement scenario when the frequency deviation range is $$\left[-\frac{5*\Delta f_{RA}}{2}, \frac{5*\Delta f_{RA}}{2}\right]$$

is implemented, thereby improving access performance of a network.

Figure 5:
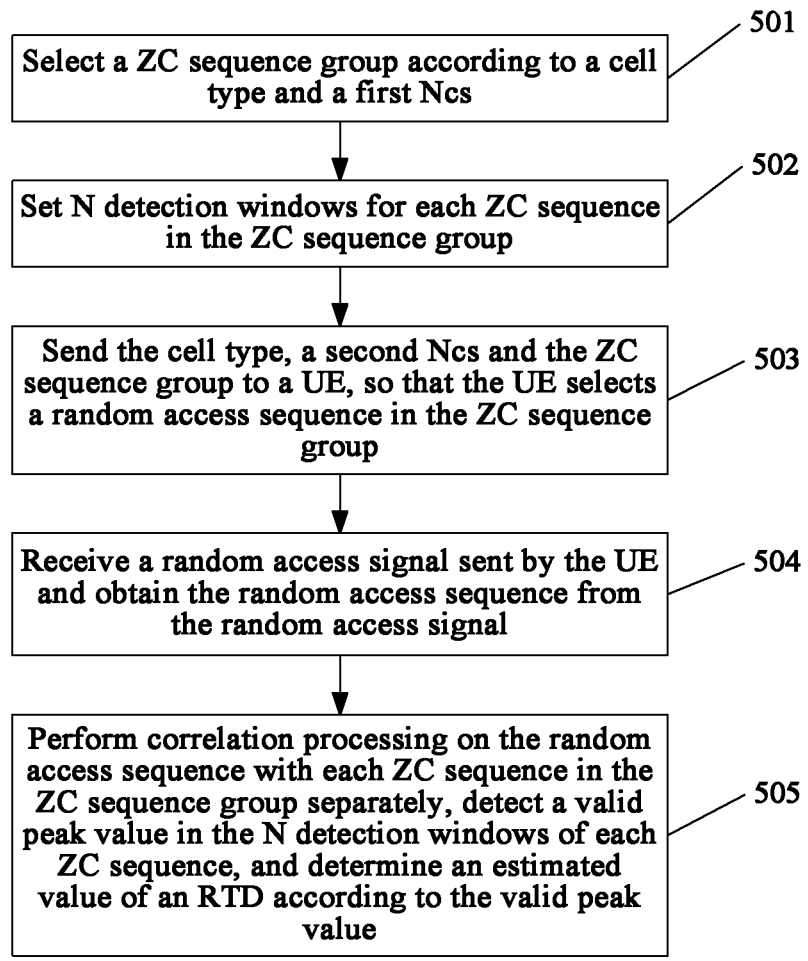
FIG. 5 is a flowchart of still another method for processing very-high-speed random access according to an embodiment of the present invention.

As shown in FIG. 5, a method for processing very-high-speed random access according to an embodiment of the present invention, where N (N≥W) detection windows are set for each ZC sequence in a ZC sequence group when a frequency deviation range of the very-high-speed random access is $$\left[-\frac{W*\Delta f_{RA}}{2}, \frac{W*\Delta f_{RA}}{2}\right],$$

where W≥5, is specifically described as follows:

501. Select a ZC sequence group according to a cell type and a first Ncs.

Selection of the ZC sequence group is obtained according to a configuration principle for root sequences of a restricted cell, which belongs to the prior art, and therefore is not described herein any further.

For relevant descriptions of the cell type and the first Ncs, refer to step 101.

502. Set N detection windows for each ZC sequence in the ZC sequence group.

When the ZC sequence group includes M ZC sequences, the setting N detection windows for each ZC sequence in the ZC sequence group is specifically described as follows:

D1. Obtain a $du_{HT}$ value of an $i^{th}$ ZC sequence in the ZC sequence group.

For relevant descriptions of the $du_{HT}$ value and an obtaining method, reference may be made to step 101, where a value of i is any integer in [1, M].

D2. Determine start positions of the N detection windows of the $i^{th}$ ZC sequence according to the $du_{HT}$ value of the $i^{th}$ ZC sequence.

The N detection windows ①, ②, ③, ④, ⑤, ⑥, ⑦ . . . of the $i^{th}$ ZC sequence respectively correspond to frequency deviations $0/-\Delta f_{RA}/+\Delta f_{RA}/-2\Delta f_{RA}/+2\Delta f_{RA}/-3\Delta f_{RA}/+3\Delta f_{RA}/$, . . . . The start positions are as follows:

a start position of the detection window ① is 0;

a start position of the detection window ② is mod($du_{HT}$, Nzc);

a start position of the detection window ③ is mod($-du_{HT}$, Nzc);

a start position of the detection window ④ is mod (2*$du_{HT}$, Nzc);

a start position of the detection window ⑤ is mod(-2*$du_{HT}$, Nzc);

a start position of the detection window ⑥ is mod (3*$du_{HT}$, Nzc);

a start position of the detection window ⑦ is mod(-3*$du_{HT}$, Nzc); and others can be so deduced;

where mod($du_{HT}$, Nzc) means $du_{HT}$ mod Nzc, and Nzc is a length of the $i^{th}$ ZC sequence.

D3. Set the N detection windows of the $i^{th}$ ZC sequence according to the start positions of the N detection windows of the $i^{th}$ ZC sequence and a preset size of a detection window.

The size of the detection window may be configured according to a cell radius, and is no less than an RTD corresponding to the cell radius.

503. Send the cell type, a second Ncs, and the ZC sequence group to a UE, so that the UE selects a random access sequence from the ZC sequence group.

For relevant descriptions of the second Ncs, refer to step 102.

504. Receive a random access signal sent by the UE, and obtain the random access sequence from the random access signal.

505. Perform correlation processing on the random access sequence with each ZC sequence in the ZC sequence group, detect a valid peak value in the N detection windows of each ZC sequence, and determine an estimated value of the RTD according to the valid peak value.

For relevant descriptions of the valid peak value, reference may be made to step 104.

The determining an estimated value of the RTD according to the valid peak value may include step E1 and step E2, which are specifically described as follows:

E1. Determine an RTD estimation window according to a detection window in which the valid peak value is located.

If the detection window of the ZC sequence in which the valid peak value is located does not overlap with other detection windows of the ZC sequence, randomly select one from the detection windows in which the valid peak value is located as the RTD estimation window; or, if the detection window of the ZC sequence in which the valid peak value is located overlaps with other detection windows of the ZC sequence but at least one valid peak value appears in a non-overlap, determine a detection window in which the at least one valid peak value is located as the RTD estimation window; or, if the detection window of the ZC sequence in which the valid peak value is located overlaps with other detection windows of the ZC sequence, and the valid peak value appears in the overlap, perform frequency deviation processing on the random access signal according to frequency deviations of two detection windows in which a primary peak value of the valid peak values is located to obtain a new valid peak value, and determine the frequency deviation and the RTD estimation window according to the new valid peak value.

Other detection windows of the ZC sequence refer to detection windows in the N detection windows of the ZC sequence except the detection window in which the valid peak value is located.

For example, assuming that N detection windows are set for each ZC sequence in step 503 and step 504, where N=6. To be specific, each ZC sequence has detection windows ①, ②, ③, ④, ⑤ and ⑥. If valid peak values are respectively detected in detection windows ③ and ⑤ of a first ZC sequence, determine whether detection windows ③ and ⑤ of the first ZC sequence overlap with other detection windows of the first ZC sequence, that is, detection windows ①, ②, ⑤ and ⑥ of the first ZC sequence.

Figure 6:
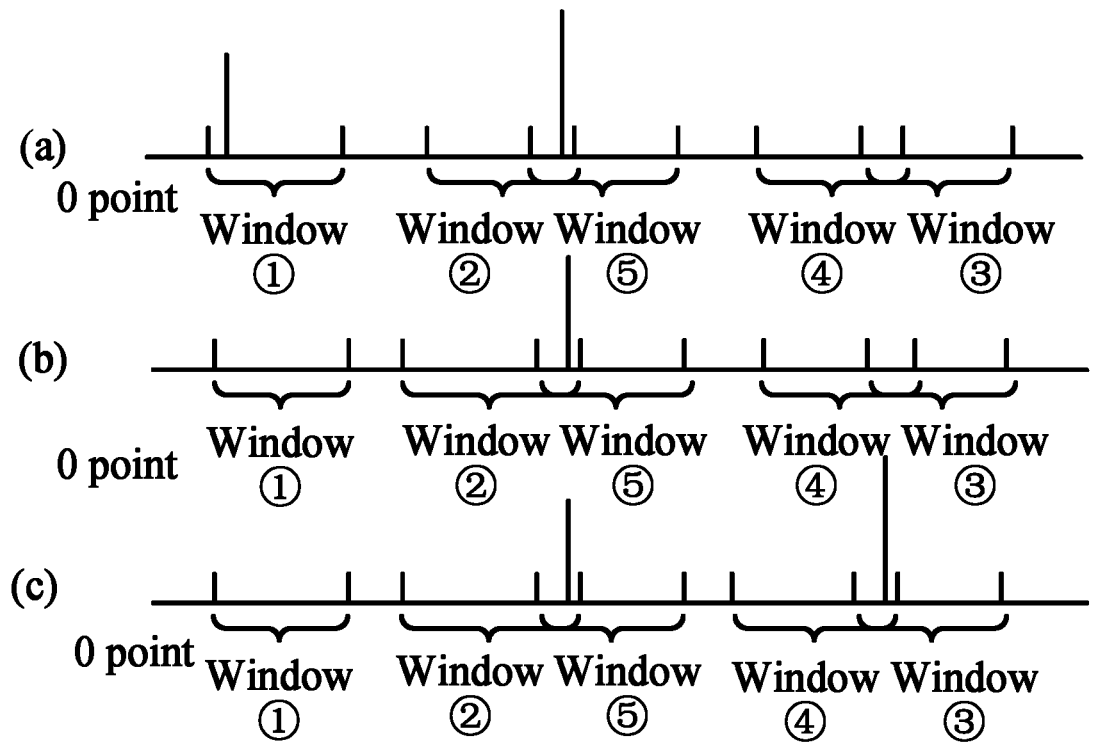
FIG. 6 is a schematic diagram of a position relation between a valid peak value and an overlap between detection windows according to an embodiment of the present invention.

That the detection windows overlap but at least one valid peak value appears in the non-overlap refers to that although the detection windows overlap, at least one valid peak value in the detected valid peak values appears in the non-overlap of the detection windows. At this moment, the detection window in which the valid peak value appearing in the non-overlap of the detection windows is located is selected to estimate the RTD. As shown in FIG. 6, it is described as follows by using five detection windows as an example.

As shown in FIG. 6(a), when a secondary peak value appears in a detection window ①, the detection window ① may be used to estimate an RTD.

As shown in FIG. 6(b), a primary peak value appears in an overlap between a detection window ② and a detection window ⑤, and no secondary peak value exists. New valid peak values are obtained after a frequency deviation of +1/−2 $\Delta f_{RA}$ is separately performed on a received signal, and frequency deviations are determined according to the new valid peak values, so as to determine an RTD estimation window.

As shown in FIG. 6(c), a primary peak value appears in an overlap between a detection window ③ and a detection window ④, and a secondary peak value appears in an overlap between the detection window ② and the detection window ⑤. New valid peak values are obtained after a frequency deviation of −1.5/+1.5 $\Delta f_{RA}$ is separately performed on the received signal, and frequency deviations are determined according to the new valid peak values, so as to determine the RTD estimation window.

As an embodiment, if the detection window of the ZC sequence in which the valid peak value is located overlaps with other detection windows of the ZC sequence and the valid peak value appears in the overlap, it is determined that no random access signal is detected in the detection window in which the valid peak value is located. Random access initiated by a UE fails, and access is initiated again.

E2. Determine the estimated value of the RTD according to a position of the valid peak value in the RTD estimation window.

For a specific implementation method of step C2, reference may be made to relevant descriptions in step 407.

It should be noted that the method for processing very-high-speed random access provided by the embodiment is applicable to a case in which a frequency deviation range is $$\left[ -\frac{W * \Delta f_{RA}}{2}, \frac{W * \Delta f_{RA}}{2} \right]$$

and W≥5. When W≥5, N detection windows are set for the ZC sequences in the selected ZC sequence group, where N is no less than W.

In the foregoing embodiment, a principle of selecting the ZC sequence for a restricted cell in the prior art is used to select the ZC sequence group, the N detection windows are set for each ZC sequence in the ZC sequence group, the valid peak value in the N detection windows of each ZC sequence is detected, and an RTD estimation window according to a detection window in which the valid peak value is located is determined, so that the round trip delay is determined. In this way, a problem that it is difficult to detect the RTD correctly in a very-high-speed scenario when a frequency deviation range is $$\left[ -\frac{W * \Delta f_{RA}}{2}, \frac{W * \Delta f_{RA}}{2} \right]$$

and W≥5 is solved, thereby improving access performance of a network.

Figure 7:
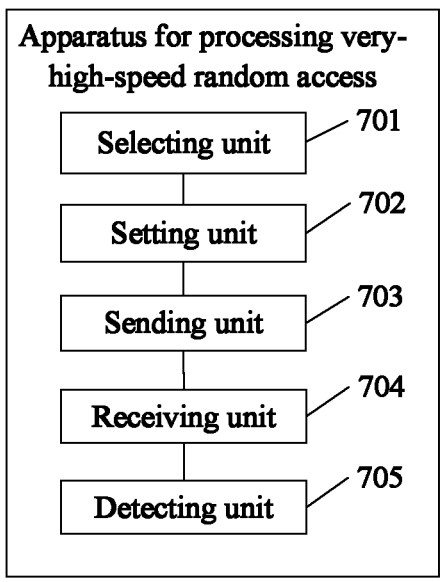
FIG. 7 is a schematic structural diagram of an apparatus for processing very-high-speed random access according to an embodiment of the present invention.

As shown in FIG. 7, an apparatus for processing very-high-speed random access according to an embodiment of the present invention may be a base station, which includes a selecting unit 701, a setting unit 702, a sending unit 703, a receiving unit 704, and a detecting unit 705.

The selecting unit 701 is configured to select a ZC sequence group according to a cell type and a first Ncs.

The setting unit 702 is configured to set N detection windows for each ZC sequence in the ZC sequence group, where N≥5.

The sending unit 703 is configured to send the cell type, a second Ncs, and the ZC sequence group selected by the selecting unit 701 to a user equipment UE, so that the UE selects a random access sequence from the ZC sequence group.

The receiving unit 704 is configured to receive a random access signal sent by the UE, and obtain the random access sequence from the random access signal.

The detecting unit 705 is configured to perform correlation processing on the random access sequence obtained by the receiving unit 704 with each ZC sequence in the ZC sequence group, detect a valid peak value in the N detection windows set by the setting unit 702 for each ZC sequence, and determine an estimated value of a round trip delay RTD according to the valid peak value.

Optionally, corresponding to the method embodiment shown in FIG. 1, when the ZC sequence group selected by the selecting unit 701 includes M ZC sequences, the setting unit 702 is further configured to:

obtain a $du_{HT}$ value of an $i^{th}$ ZC sequence in the ZC sequence group;

determine start positions of the N detection windows of the $i^{th}$ ZC sequence according to the $du_{HT}$ value of the $i^{th}$ ZC sequence; and set the N detection windows of the $i^{th}$ ZC sequence according to the start positions of the N detection windows of the $i^{th}$ ZC sequence and a preset size of a detection window.

The $du_{HT}$ value of the $i^{th}$ ZC sequence refers to a shift of a mirror image peak in a power delay profile PDP of the $i^{th}$ ZC sequence relative to the RTD when a frequency deviation is $$\pm \frac{1}{T_{SEQ}},$$

where $T_{SEQ}$ is a time duration occupied by the $i^{th}$ ZC sequence and a value of i is any integer in [1, M]. For an obtaining method of the $du_{HT}$ value, refer to relevant descriptions in step 101.

The size of a detection window may be configured according to a cell radius, and cannot be less than a maximum value of the RTD.

Optionally, when a frequency deviation range of the very-high-speed access is $$\left[ -\frac{5 * \Delta f_{RA}}{2}, \frac{5 * \Delta f_{RA}}{2} \right]$$

and the ZC sequence selected by the selecting unit 701 includes M ZC sequences, that is, corresponding to the method embodiment shown in FIG. 2, the setting unit 702 is further configured to:

obtain a $du_{HT}$ value of the $i^{th}$ ZC sequence in the ZC sequence group; and set five detection windows of the $i^{th}$ ZC sequence according to the $du_{HT}$ value of the $i^{th}$ ZC sequence.

The $du_{HT}$ value of the $i^{th}$ ZC sequence refers to a shift of a mirror image peak in a power delay profile PDP of the $i^{th}$ ZC sequence relative to the RTD when a frequency deviation is $$\pm \frac{1}{T_{SEQ}},$$

where $T_{SEQ}$ is a time duration occupied by the $i^{th}$ ZC sequence and a value of i is any integer in [1, M]. For an obtaining method of the $du_{HT}$ value, refer to relevant descriptions in step 101.

Optionally, when the frequency deviation range of the very-high-speed random access is $$\left[-\frac{5*\Delta f_{RA}}{2}, \frac{5*\Delta f_{RA}}{2}\right]$$

and N detection windows are set for each ZC sequence in the ZC sequence group, where N=5, that is, corresponding to the method embodiment shown in FIG. 2, the setting unit 702 is further configured to:

obtain start positions of the five detection windows of the $i^{th}$ ZC sequence according to the $du_{HT}$ value of the $i^{th}$ ZC sequence, where a start position of a detection window ① is 0;

a start position of a detection window ② is mod($du_{HT}$, Nzc);

a start position of a detection window ③ is mod($du_{HT}$, Nzc);

a start position of a detection window ④ is mod(2*$du_{HT}$, Nzc);

a start position of a detection window ⑤ is mod(2*$du_{HT}$, Nzc); and set the five detection windows of the $i^{th}$ ZC sequence according to the start positions of the five detection windows and a preset size of a detection window.

Nzc is a length of the $i^{th}$ ZC sequence. For an obtaining method of the $du_{HT}$ value, refer to relevant descriptions in step 101. For relevant descriptions of the preset size of the detection window, refer to step 104. The five detection windows ①, ②, ③, ④ and ① respectively correspond to frequency deviations 0, $-\Delta f_{RA}$, $+\Delta f_{RA}$, $-2\Delta f_{RA}$ and $+2\Delta f_{RA}$.

Optionally, when the frequency deviation range of the very-high-speed random access is $$\left[-\frac{5*\Delta f_{RA}}{2}, \frac{5*\Delta f_{RA}}{2}\right],$$

corresponding to the method embodiment shown in FIG. 2, the setting unit 701 is further configured to:

determine whether $du_{HT}$ values of ZC sequences in the selected ZC sequence group meet a condition $$|du_{HT}| \in \left[Ncs, \frac{Nzc - Ncs}{4}\right] \cup$$

$$\left[\frac{Nzc + Ncs}{4}, \frac{Nzc - Ncs}{3}\right] \cup \left[\frac{Nzc + Ncs}{3}, \frac{Nzc - Ncs}{2}\right],$$

where, in the condition, the Ncs is the first Ncs, and the Nzc is a length of a ZC sequence;

if the $du_{HT}$ value of at least one ZC sequence in the selected ZC sequence group does not meet the condition, reselect a ZC sequence group according to the cell type and the first Ncs; and if the $du_{HT}$ values of the ZC sequences in the selected ZC sequence group all meet the condition, send the selected ZC sequence group to the setting unit 702 and the sending unit 703.

Optionally, corresponding to the method embodiment shown in FIG. 4, the detecting unit 704 is further configured to:

detect a primary peak value in the valid peak values in the five detection windows of each ZC sequence in the ZC sequence group;

determine a search window for a secondary peak value in the valid peak values according to a detection window in which the primary peak value is located;

detect the secondary peak value in the search window for the secondary peak value, and determine an RTD estimation window according to a combination relation between the detection window in which the primary peak value is located and a detection window in which the secondary peak value is located; and determine the estimated value of the RTD according to a position of the valid peak value in the RTD estimation window.

Optionally, corresponding to the method embodiment shown in FIG. 5, the setting unit 702 is further configured to:

determine start positions of the N detection windows of the $i^{th}$ ZC sequence according to the $du_{HT}$ value of the $i^{th}$ ZC sequence in the ZC sequence group as follows:

a start position of the detection window ① is 0;

a start position of the detection window ② is mod($du_{HT}$, Nzc);

a start position of the detection window ③ is mod($-du_{HT}$, Nzc);

a start position of the detection window ④ is mod(2*$du_{HT}$, Nzc);

a start position of the detection window ⑤ is mod($-2*du_{HT}$, Nzc);

a start position of the detection window ⑥ is mod(3*$du_{HT}$, Nzc);

a start position of the detection window ⑦ is mod($-3*du_{HT}$, Nzc); and others can be so deduced;

where mod($du_{HT}$, Nzc) means $du_{HT}$ mod Nzc, and Nzc is a length of the $i^{th}$ ZC sequence; and set the N detection windows of the $i^{th}$ ZC sequence according to the start positions of the N detection windows of the $i^{th}$ ZC sequence and a preset size of a detection window.

The N detection windows ①, ②, ③, ④ and ⑤ . . . of the ZC sequence respectively correspond to frequency deviations 0, $-\Delta f_{RA}$, $+\Delta f_{RA}$, $-2\Delta f_{RA}$, $+2\Delta f_{RA}$, $-3\Delta f_{RA}$ and $+3\Delta f_{RA}$, . . . .

The detecting unit 704 is further configured to:

determine an RTD estimation window according to a detection window in which the valid peak value is located; and if the detection window of the ZC sequence in which the valid peak value is located does not overlap with other detection windows of the ZC sequence, randomly select one from the detection windows in which the valid peak value is located as the RTD estimation window; or, if the detection window of the ZC sequence in which the valid peak value is located overlaps with other detection windows of the ZC sequence, but at least one valid peak value appears in a non-overlap, determine a detection window in which the at least one valid peak value is located as the RTD estimation window; or if the detection window of the ZC sequence in which the valid peak value is located overlaps with other detection windows of the ZC sequence, and the valid peak value appears in an overlap, determine that no random access signal is detected in the detection window in which the valid peak value is located; or perform frequency deviation processing on the random access signal according to frequency deviations of two detection windows in which a primary peak value of the valid peak values is located to obtain a new valid peak value, and determine the frequency deviation and the RTD estimation window according to the new valid peak value; and determine the estimated value of the RTD according to a position of the valid peak value in the RTD estimation window.

Relevant descriptions of other detection windows in the ZC sequence are consistent with those in step 507.

Optionally, the detecting unit 704 is further configured to:

estimate the frequency deviation according to a detection window in which the valid peak value is located.

For the estimating the frequency deviation according to a detection window in which the valid peak value is located, refer to step 206.

It should be noted that the selecting unit 701, the setting unit 702, the sending unit 703, the receiving unit 704, and the detecting unit 705 may all be a central processing unit (CPU), a digital signal processor, or other processors.

The apparatus for processing very-high-speed random access provided by the foregoing embodiment solves a problem that an RTD of a random access signal cannot be correctly detected in a very-high-speed scenario, ensures that a user equipment moving at a very high speed can correctly adjust a TA value according to a detected RTD, and therefore correctly adjusts message sending timing, so that the user equipment in a very-high-speed scenario can normally access a network, thereby improving access performance of the network.

A system for processing very-high-speed random access provided by the embodiment includes the apparatus for processing very-high-speed random access shown in FIG. 7.

Persons of ordinary skill in the art may understand that all or a part of the steps of the foregoing method embodiments may be implemented by a program instructing relevant hardware. The program may be stored in a computer readable storage medium. When the program runs, the steps of the foregoing method embodiments are performed. The storage medium may include any medium capable of storing program code, such as a read-only memory (ROM), a random access memory (RAM), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the spirit and scope of the technical solutions of the embodiments of the present invention.

What is claimed is:

1. A method, comprising:

obtaining a Zadoff-Chu (ZC) sequence group according to a cell type and a first cyclic shift parameter, wherein the ZC sequence group comprises M ZC sequences, and a $du_{HT}$ value for a $j^{th}$ ZC sequence in the ZC sequence group meets a condition $$|du_{HT}| \in [Ncs, \frac{Nzc - Ncs}{4}] \cup [\frac{Nzc + Ncs}{4}, \frac{Nzc - Ncs}{3}] \cup [\frac{Nzc + Ncs}{3}, \frac{Nzc - Ncs}{2}],$$

wherein Ncs is the first cyclic shift parameter, Nzc is the length of the $j^{th}$ ZC sequence, and j is an integer out of integers from 1 to M; and detecting a random access sequence from a user equipment (UE) according to at least one ZC sequence in the ZC sequence group.

2. The method according to claim 1, wherein the method further comprises:

setting N detection windows for each ZC sequence in the ZC sequence group, wherein N≥5.

3. The method according to claim 2, wherein detecting the random access sequence from the UE according to the at least one ZC sequence in the ZC sequence group comprises: performing correlation processing on the random access sequence with each ZC sequence in the ZC sequence group, detecting a valid peak value in the N detection windows of each ZC sequence, and determining an estimated value of a round trip delay (RTD) according to the valid peak value.

4. The method according to claim 3, wherein setting the N detection windows for the $j^{th}$ ZC sequence in the ZC sequence group comprises:

obtaining a $du_{HT}$ value for the $j^{th}$ ZC sequence in the ZC sequence group;

determining start positions of the N detection windows of the $j^{th}$ ZC sequence according to the $du_{HT}$ value for the $j^{th}$ ZC sequence; and setting the N detection windows of the $j^{th}$ ZC sequence according to the start positions of the N detection windows of the $j^{th}$ ZC sequence and a preset detection window size;

wherein the $du_{HT}$ value for the $j^{th}$ ZC sequence corresponds to a shift of a mirror image peak in a power delay profile (PDP) of the $j^{th}$ ZC sequence relative to the RTD, wherein a frequency deviation is $$\pm \frac{1}{T_{SEQ}},$$

and wherein $T_{SEQ}$ is a time duration occupied by the $j^{th}$ ZC sequence.

5. The method according to claim 3, wherein frequency deviation range of random access is $$\left[-\frac{5*\Delta f_{RA}}{2}, \frac{5*\Delta f_{RA}}{2}\right]$$

in which $\Delta f_{RA}$ represents a subcarrier spacing of a random access channel, and wherein setting the N detection windows for a $j^{th}$ ZC sequence in the ZC sequence group comprises:
    obtaining a $du_{HT}$ value for the $j^{th}$ ZC sequence in the ZC sequence group; and
    setting five detection windows of the $j^{th}$ ZC sequence according to the $du_{HT}$ value for the $j^{th}$ ZC sequence;
    wherein the $du_{HT}$ value for the $j^{th}$ ZC sequence corresponds to a shift of a mirror image peak in a power delay profile (PDP) of the $j^{th}$ ZC sequence relative to the RTD, wherein a frequency deviation is $$\pm\frac{1}{T_{SEQ}},$$

wherein $T_{SEQ}$ is a time duration occupied by the $j^{th}$ ZC sequence.

6. The method according to claim 5, wherein setting the five detection windows of the $j^{th}$ ZC sequence according to the $du_{HT}$ value for the $j^{th}$ ZC sequence comprises:
    obtaining start positions of the five detection windows of the $j^{th}$ ZC sequence according to the $du_{HT}$ value for the $j^{th}$ ZC sequence, wherein the five detection windows comprise a detection window ①, a detection window ②, a detection window ③, a detection window ④ and a detection window ⑤, wherein a start position of the detection window ① is 0, wherein a start position of the detection window ② is mod($du_{HT}$, Nzc), wherein a start position of the detection window ③ is mod($-du_{HT}$, Nzc), wherein a start position of the detection window ④ is mod($2*du_{HT}$ Nzc), wherein a start position of the detection window ⑤ is mod($-2*du_{HT}$ Nzc); and
    setting the five detection windows of the ZC sequence according to the start positions of the five detection windows and a preset detection window size.

7. The method according to claim 3, wherein detecting the valid peak value in the N detection windows of each ZC sequence and determining an estimated value of a round trip delay (RTD) according to the valid peak value comprises:
    detecting a primary peak value from valid peak values in the N detection windows of each ZC sequence;
    determining a search window for a secondary peak value in the valid peak values according to a detection window in which the primary peak value is located;
    detecting the secondary peak value in the search window for the secondary peak value, and determining an RTD estimation window according to a combination relation between the detection window in which the primary peak value is located and a detection window in which the secondary peak value is located; and
    determining the estimated value of the RTD according to a position of the valid peak value in the RTD estimation window.

8. The method according to claim 3, wherein determining the estimated value of the RTD according to the valid peak value comprises:
    determining an RTD estimation window according to a detection window in which the valid peak value is located; and
    determining the estimated value of the RTD according to a position of the valid peak value in the RTD estimation window.

9. The method according to claim 1, wherein the cell type indicates whether a cell is an unrestricted cell or a restricted cell.

10. The method according to claim 1, wherein the method further comprises:
    based on a $du_{HT}$ value for at least one ZC sequence in a ZC sequence group not meeting the condition, reselecting another ZC sequence group according to a cell type and a first cyclic shift parameter.

11. An apparatus, comprising:
    a processor; and
    a non-transitory computer-readable storage medium having processor-executable instructions stored thereon;
    wherein the processor-executable instructions, when executed by the processor, facilitate:
    obtaining a Zadoff-Chu (ZC) sequence group according to a cell type and a first cyclic shift parameter, wherein the ZC sequence group comprises M ZC sequences, and a $du_{HT}$ value for a $j^{th}$ ZC sequence in the ZC sequence group meets a condition $$|du_{HT}| \in \left[Ncs, \frac{Nzc-Ncs}{4}\right] \cup \left[\frac{Nzc+Ncs}{4}, \frac{Nzc-Ncs}{3}\right] \cup \left[\frac{Nzc+Ncs}{3}, \frac{Nzc-Ncs}{2}\right],$$

wherein Ncs is the first cyclic shift parameter, Nzc is the length of the $j^{th}$ ZC sequence, and j is an integer out of integers from 1 to M; and
    detecting a random access sequence from a user equipment (UE) according to at least one ZC sequence in the ZC sequence group.

12. The apparatus according to claim 11, wherein the processor-executable instructions, when executed by the processor, further facilitate:
    setting N detection windows for each ZC sequence in the ZC sequence group, wherein N≥5.

13. The apparatus according to claim 12, wherein detecting the random access sequence from the UE according to the at least one ZC sequence in the ZC sequence group comprises: performing correlation processing on the random access sequence with each ZC sequence in the ZC sequence group, detecting a valid peak value in the N detection windows for each ZC sequence, and determining an estimated value of a round trip delay (RTD) according to the valid peak value.

14. The apparatus according to claim 13, wherein the processor-executable instructions, when executed by the processor, further facilitate:
    obtaining a $du_{HT}$ value for the $j^{th}$ ZC sequence in the ZC sequence group;
    determining start positions of the N detection windows of the $j^{th}$ ZC sequence according to the $du_{HT}$ value for the $j^{th}$ ZC sequence; and
    setting the N detection windows of the $j^{th}$ ZC sequence according to the start positions of the N detection windows of the $j^{th}$ ZC sequence and a preset detection window size;
    wherein the $du_{HT}$ value for the $j^{th}$ ZC sequence corresponds to a shift of a mirror image peak in a power delay profile (PDP) of the $j^{th}$ ZC sequence relative to the RTD, wherein a frequency deviation is $$\pm \frac{1}{T_{SEQ}},$$

and wherein $T_{SEQ}$ is a time duration occupied by the $j^{th}$ ZC sequence.

15. The apparatus according to claim 13, wherein a frequency deviation range of random access is $$\left[ -\frac{5*\Delta f_{RA}}{2}, \frac{5*\Delta f_{RA}}{2} \right],$$

and wherein the processor-executable instructions, when executed by the processor, further facilitate:
  obtaining a $du_{HT}$ value for the $j^{th}$ ZC sequence in the ZC sequence group; and
  setting five detection windows of the $j^{th}$ ZC sequence according to the $du_{HT}$ value for the $j^{th}$ ZC sequence;
  wherein the $du_{HT}$ value for the $j^{th}$ ZC sequence corresponds to a shift of a mirror image peak in a power delay profile (PDP) of the $j^{th}$ ZC sequence relative to the RTD, wherein a frequency deviation is $$\pm \frac{1}{T_{SEQ}},$$

and wherein $T_{SEQ}$ is a time duration occupied by the $j^{th}$ ZC sequence.

16. The apparatus according to claim 15, wherein the cell type indicates whether a cell is an unrestricted cell or a restricted cell.

17. The apparatus according to claim 11, wherein the processor-executable instructions, when executed by the processor, further facilitate:
  based on a $du_{HT}$ value for at least one ZC sequence in a ZC sequence group not meeting the condition, reselecting another ZC sequence group according to a cell type and a first cyclic shift parameter.

18. A non-transitory computer readable medium comprising processor-executable instructions stored thereon, wherein the processor-executable instructions include:
  instructions for obtaining a Zadoff-Chu (ZC) sequence group according to a cell type and a first cyclic shift parameter, wherein the ZC sequence group comprises M ZC sequences, and a $du_{HT}$ value for a $j^{th}$ ZC sequence in the ZC sequence group meets a condition $$|du_{HT}| \in \left[ Ncs, \frac{Nzc - Ncs}{4} \right] \cup$$
$$\left[ \frac{Nzc + Ncs}{4}, \frac{Nzc - Ncs}{3} \right] \cup \left[ \frac{Nzc + Ncs}{3}, \frac{Nzc - Ncs}{2} \right],$$

wherein Ncs is the first cyclic shift parameter, Nzc is the length of the $j^{th}$ ZC sequence, and j is an integer out of integers from 1 to M; and
  instructions for detecting a random access sequence from a user equipment (UE) according to at least one ZC sequence in the ZC sequence group.

19. The non-transitory computer readable medium according to claim 18, wherein the cell type indicates whether a cell is an unrestricted cell or a restricted cell.

20. The non-transitory computer readable medium according to claim 18, wherein the processor-executable instructions further include:
  instructions for reselecting, based on a $du_{HT}$ value for at least one ZC sequence in a ZC sequence group not meeting the condition, another ZC sequence group according to a cell type and a first cyclic shift parameter.

21. A method, comprising:
  obtaining a random access sequence from a Zadoff-Chu (ZC) sequence group, wherein the ZC sequence group comprises M ZC sequences, and a $du_{HT}$ value for a $j^{th}$ ZC sequence in the ZC sequence group meets a condition $$|du_{HT}| \in \left[ Ncs, \frac{Nzc - Ncs}{4} \right] \cup$$
$$\left[ \frac{Nzc + Ncs}{4}, \frac{Nzc - Ncs}{3} \right] \cup \left[ \frac{Nzc + Ncs}{3}, \frac{Nzc - Ncs}{2} \right],$$

wherein Ncs is a first cyclic shift parameter, Nzc is the length of the $j^{th}$ ZC sequence, and j is an integer out of integers from 1 to M; and
  transmitting a random access signal according to the random access sequence.

22. An apparatus, comprising:
  a processor; and
  a non-transitory computer-readable storage medium having processor-executable instructions stored thereon;
  wherein the processor-executable instructions, when executed by the processor, facilitate:
    obtaining a random access sequence from a Zadoff-Chu (ZC) sequence group, wherein the ZC sequence group comprises M ZC sequences, and a $du_{HT}$ value for a $j^{th}$ ZC sequence in the ZC sequence group meets a condition $$|du_{HT}| \in \left[ Ncs, \frac{Nzc - Ncs}{4} \right] \cup$$
$$\left[ \frac{Nzc + Ncs}{4}, \frac{Nzc - Ncs}{3} \right] \cup \left[ \frac{Nzc + Ncs}{3}, \frac{Nzc - Ncs}{2} \right],$$

wherein Ncs is a first cyclic shift parameter, Nzc is the length of the $j^{th}$ ZC sequence, and j is an integer out of integers from 1 to M; and
    transmitting a random access signal according to the random access sequence.

23. A non-transitory computer readable medium comprising processor-executable instructions stored thereon, wherein the processor-executable instructions include:
  instructions for obtaining a random access sequence from a Zadoff-Chu (ZC) sequence group, wherein the ZC sequence group comprises M ZC sequences, and a $du_{HT}$ value for a $j^{th}$ ZC sequence in the ZC sequence group meets a condition $$|du_{HT}| \in \left[ Ncs, \frac{Nzc - Ncs}{4} \right] \cup$$

-continued
$$\left[\frac{Nzc + Ncs}{4}, \frac{Nzc - Ncs}{3}\right] \cup \left[\frac{Nzc + Ncs}{3}, \frac{Nzc - Ncs}{2}\right],$$

wherein Ncs is a first cyclic shift parameter, Nzc is the length of the $j^{th}$ ZC sequence, and j is an integer out of integers from 1 to M; and instructions for transmitting a random access signal according to the random access sequence.

* * * * *

UNITED STATES PATENT AND TRADEMARK OFFICE
CERTIFICATE OF CORRECTION

PATENT NO. : 10,827,533 B2
APPLICATION NO. : 16/663043
DATED : November 3, 2020
INVENTOR(S) : Wan Page 1 of 1

It is certified that error appears in the above-identified patent and that said Letters Patent is hereby corrected as shown below:

On the Title Page

Page 2, Item (56) Other Publications, Citation 14: "PCT/CN20131076974, pp. 1-7 (dated Sep. 12, 2013)." should read -- PCT/CN2013/076974, pp. 1-7 (dated Sep. 12, 2013). --.

In the Claims

Claim 6: Column 31, Line 41: "setting the five detection windows of the ZC sequence" should read -- setting the five detection windows of the $j^{th}$ ZC sequence --.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*